(12) United States Patent
Makinen et al.

(10) Patent No.: US 8,026,798 B2
(45) Date of Patent: Sep. 27, 2011

(54) TECHNIQUES FOR PRESENTING VEHICLE-RELATED INFORMATION

(75) Inventors: Ville Makinen, Espoo (FI); Jukka Linjama, Espoo (FI); Moaffak Ahmed, Helsinki (FI)

(73) Assignee: Senseg Ltd., Helsinki (FI)

( * ) Notice: Subject to any disclaimer, the term of this patent is extended or adjusted under 35 U.S.C. 154(b) by 0 days.

(21) Appl. No.: 13/122,113

(22) PCT Filed: Oct. 3, 2008

(86) PCT No.: PCT/FI2008/050550
§ 371 (c)(1),
(2), (4) Date: Apr. 21, 2011

(87) PCT Pub. No.: WO2010/037894
PCT Pub. Date: Apr. 8, 2010

(65) Prior Publication Data
US 2011/0187516 A1    Aug. 4, 2011

(51) Int. Cl.
*H04B 3/36* (2006.01)
(52) U.S. Cl. ........... 340/407.1; 340/407.2; 340/428; 340/429; 340/514; 340/515; 340/535; 340/538.16; 340/562; 340/686.2; 340/692
(58) Field of Classification Search .......... 340/407.1, 340/407.2, 428, 429, 514, 515, 535, 538.16, 340/562, 686.2, 692
See application file for complete search history.

(56) References Cited

U.S. PATENT DOCUMENTS

| | | | |
|---|---|---|---|
| 3,267,931 A | 8/1966 | Phuarich et al. | |
| 4,210,905 A * | 7/1980 | Coons | 340/575 |
| 5,436,565 A | 7/1995 | Gammell et al. | |
| 5,929,573 A | 7/1999 | Louwers et al. | |
| 6,815,657 B2 | 11/2004 | Toyoshima et al. | |
| 7,019,623 B2 * | 3/2006 | Klausner et al. | 340/425.5 |
| 7,321,311 B2 * | 1/2008 | Rieth et al. | 340/576 |
| 7,520,365 B2 * | 4/2009 | Fukuba et al. | 180/402 |
| 7,924,144 B2 | 4/2011 | Makinen et al. | |

(Continued)

FOREIGN PATENT DOCUMENTS

EP    1731993 A1    12/2006

(Continued)

OTHER PUBLICATIONS

"U.S. Appl. No. 12/232,536, Non Final Office Action mailed Dec. 14, 2010", 7 pgs.

(Continued)

*Primary Examiner* — Tai T Nguyen
(74) *Attorney, Agent, or Firm* — Schwegman, Lundberg & Woessner, P.A.

(57) ABSTRACT

An apparatus for presenting a time-variant information element in a vehicle, which has a steering wheel (1602), comprises one or more remotely and individually controllable tactile pads (1620), which produce a tactile sensation in response to a respective pad output signal, which is produced by a controller (CTRL). The tactile pads are positioned or adapted to be positioned on the steering wheel (1602) or proximate to it, such that they can be touched by at least one hand (1610,1612) of the vehicle driver while driving the vehicle. The apparatus further comprises means for determining the time-variant information element to be presented and for applying the determined time-variant information element to the controller and means for encoding the determined time-variant information element by the controller into temporal variations of the one or more pad output signals.

12 Claims, 11 Drawing Sheets

U.S. PATENT DOCUMENTS

| | | | |
|---|---|---|---|
| 2003/0067449 | A1 | 4/2003 | Yoshikawa et al. |
| 2004/0104887 | A1 | 6/2004 | Tsukamoto et al. |
| 2004/0192423 | A1 | 9/2004 | Neverman |
| 2004/0220485 | A1 | 11/2004 | Rytky |
| 2005/0030166 | A1 | 2/2005 | Kraus et al. |
| 2005/0057528 | A1 | 3/2005 | Kleen |
| 2008/0143693 | A1 | 6/2008 | Schena |
| 2008/0174415 | A1 | 7/2008 | Tanida et al. |
| 2009/0079550 | A1 | 3/2009 | Makinen et al. |
| 2009/0109007 | A1 | 4/2009 | Makinen et al. |
| 2011/0074733 | A1 | 3/2011 | Mäkinen et al. |

FOREIGN PATENT DOCUMENTS

| | | |
|---|---|---|
| EP | 1939712 A1 | 7/2008 |
| FI | 20080213 | 11/2008 |
| JP | 3543097 B2 | 7/2004 |
| WO | WO-02073587 A1 | 9/2002 |
| WO | WO-2004051451 A2 | 6/2004 |
| WO | WO-2007111909 A2 | 10/2007 |
| WO | WO-2009037379 | 3/2009 |
| WO | WO-2009141502 A1 | 11/2009 |
| WO | WO-2010037894 A1 | 4/2010 |

OTHER PUBLICATIONS

"U.S. Appl. No. 12/232,536, Notice of Allowance mailed Feb. 22, 2011", 5 pgs.

"U.S. Appl. No. 12/232,548, Non Final Office Action mailed Jan. 7, 2011", 10 pgs.

"U.S. Appl. No. 12/232,548, Preliminary Amendment filed Sep. 18, 2008".

"U.S. Appl. No. 12/232,548, Response filed Apr. 4, 2011 to Non-Final Office Action", 12 pgs.

"U.S. Appl. No. 12/232,548, Supplemental Preliminary Amendment filed Sep. 6, 2010", 5 pgs.

"U.S. Appl. No. 12/232.536. Response filed Feb. 8, 2011 to Non Final Office Action mailed Dec. 14, 2010", 9 pgs.

"U.S. Appl. No. 12/993,784, Preliminary Amendment filed Nov. 19, 2010", 9 pgs.

"U.S. Appl. No. 12/993,784, Supplemental Preliminary Amendment filed Dec. 7, 2010", 4 pgs.

"International Application Serial No. PCT/FI2008/050550, PCT Search Report mailed Jun. 12, 2009", 3 pgs.

Agarwal, A. K, et al., "A hybrid natural/artificial electrostatic actuator for tactile stimulation", 2nd Annual International IEEE-EMB Special Topic Conference on Microtechnologies in Medicine & Biology, Abstract; sections II.A, II.B and III.A; figures 1-2, (2002), 341-345.

Beebe, David J., et al., "A polyimide-on-silicon electrostatic fingertip tactile display", IEEE 17th Annual Conference Engineering in Medicine and Biology Society, vol. 2, (1995), 1545-1546.

Fukumoto, M., et al., "Active Click: Tactile Feedback for Touch Panels", New York: ACM, ISBN 1-58113-340-5, Whole document, (2001), 121-122.

Gunther, "Skinscape: A Tool for Composition in the Tactile Modality", Massachusetts Institute of Technology, (2001), 1-118.

Kaczmarek, K. A, et al., "Electrotactile and vibrotactile displays for sensory substitution systems", IEEE Transactions on Biomedical Engineering, 38(1), (Jan. 1991), 1-16.

Kaczmarek, Kurt A., et al., "Polarity Effect in Electrovibration for Tactile Display", IEEE Transactions on Biomedical Engineering, 53(10), (Oct. 2006), 2047-2054.

Kajimoto, H, et al., "Electro-Tactile Display with Tactile Primary Color Approach", Proceedings of International Conference on Intelligent Robots and Systems, (2004), 10 pgs.

Kajimoto, H., et al., "Psychophysical evaluation of receptor selectivity in electro-tactile display", 13th International Symposium on Measurement and Control in Robotics (ISMCR), Madrid, Spain, http://files.tachilab.org/intconf2000/kajimoto200312ISMCR.pdf, (2003), 4 pgs.

Kajimoto, H., et al., "Tactile Feeling Display using Functional Electrical Stimulation", 9th International Conference on Artificial Reality and Tele-Existence (ICAT'99), Tokyo, Japan; [online] Accessed from http://files.tachilab.org/intconf1900/kajimoto1999ICAT.pdf,, (1999), 8 pgs.

Kuroki, S., et al., "Proposal for tactile sense presentation that combines electrical and mechanical stimulus", Second Joint EuroHaptics Conference, 2007 and Symposium on Haptic Interfaces for Virtual Environment and Teleoperator Systems. World Haptics 2007., (2007), 121-126.

Linjama, Jukka, et al., "E-Sense screen: Novel haptic display with Capacitive Electrosensory Interface", Demo paper Submitted for HAID 09, 4th Workshop for Haptic and Audio Interaction Design, Dresden, Germany, (Sep. 10-11, 2009), 1-2.

Pfeiffer, E. A, "Electrical stimulation of sensory nerves with skin electrodes for research, diagnosis, communication and behavioral conditioning: a survey", Med Biol Eng., 6(6), (Nov. 1968), 637-51.

Poupyrev, I., et al., "Ambient touch: designing tactile interfaces for handheld devices", UIST '02 Proceedings of the 15th annual ACM symposium on User interface software and technology, XP 001171567, abstract; section 'TouchEngine display', (2002), 51-60.

Reilly, J. P, et al., "Electrocutaneous Stimulation with High Voltage Capacitive Discharges", IEEE Transactions on Biomedical Engineering, vol. BME-30 , Issue: 10, (1983), 631-641.

Rekimoto, J, et al., "SmartSkin: An Infrastructure for Freehand Manipulation on Interactive Surfaces.", CHI '02 Proceedings of the SIGCHI conference on Human factors in computing systems: Changing our world, changing ourselves, XP 001099406, abstract; figure 2; section 'SmartSkin sensor architecture'; firgures 12-14; sections 'Interactions by using fingers and hand gestures' and 'Combination with tactile feedback', (2002), 113-120.

Tang, H., et al., "A Microfabricated Electrostatic Haptic Display for Persons with Visual Impairments", IEEE Transactions on Rehabilitation Engineering, ISSN 1063-6528, vol. 6, No. 3,, XP 011053920, abstract; Figure 1; sections II.A, II.B and II.D, (Sep. 1998), 241-248.

Yamamoto, A., et al., "Electrostatic Tactile Display with Thin Film Slider and Its Application to Tactile Telepresentation Systems", IEEE Transactions on Visualization and Computer Graphics, 12(2), (Mar./Apr. 2006), 168-177.

"International Application Serial No. PCT/FI2008/050550, International Preliminary Report on Patentability mailed Jun. 12, 2009", 6 pgs.

"International Application Serial No. PCT/FI2008/050550, PCT Written Opinion mailed Jun. 12, 2009", 7 pgs.

* cited by examiner

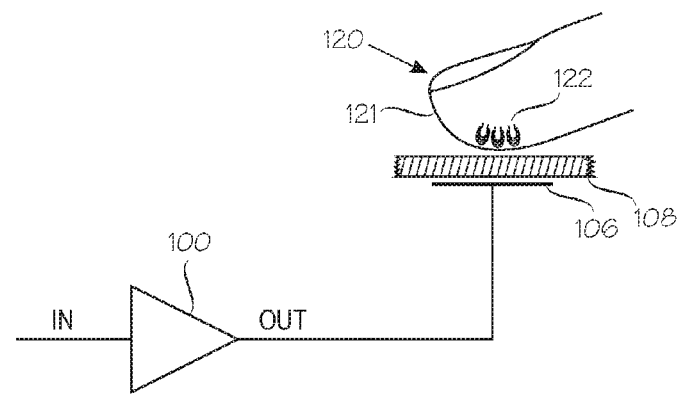
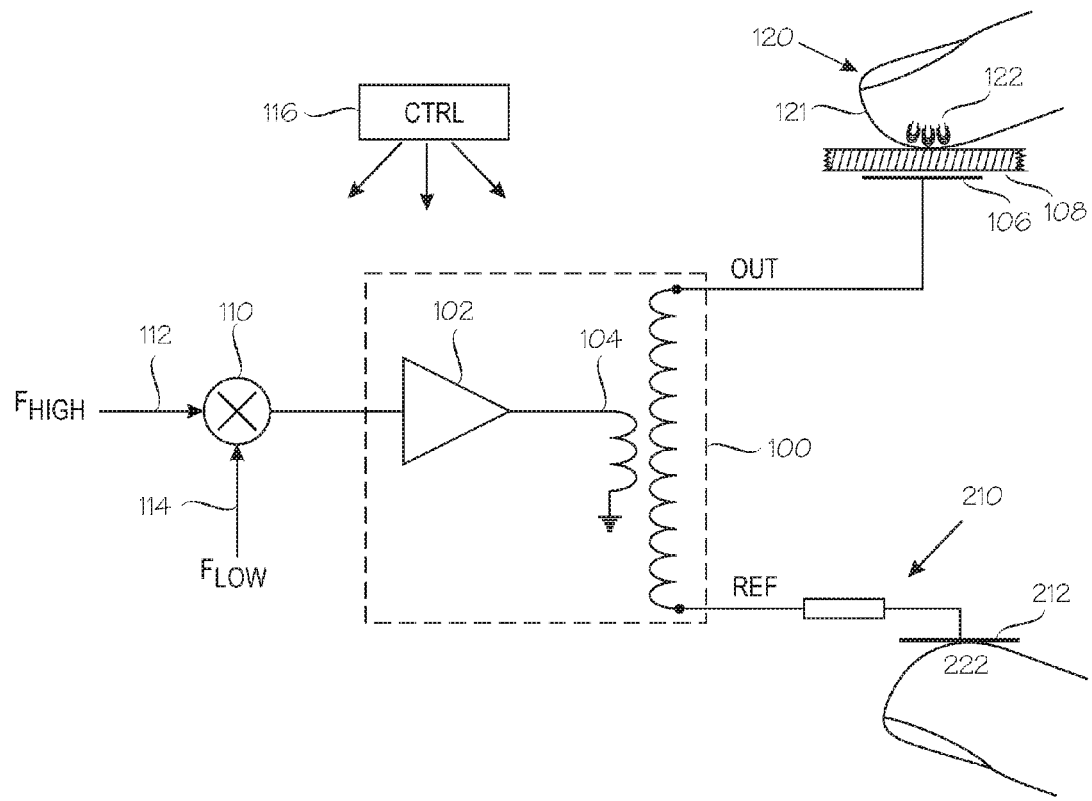

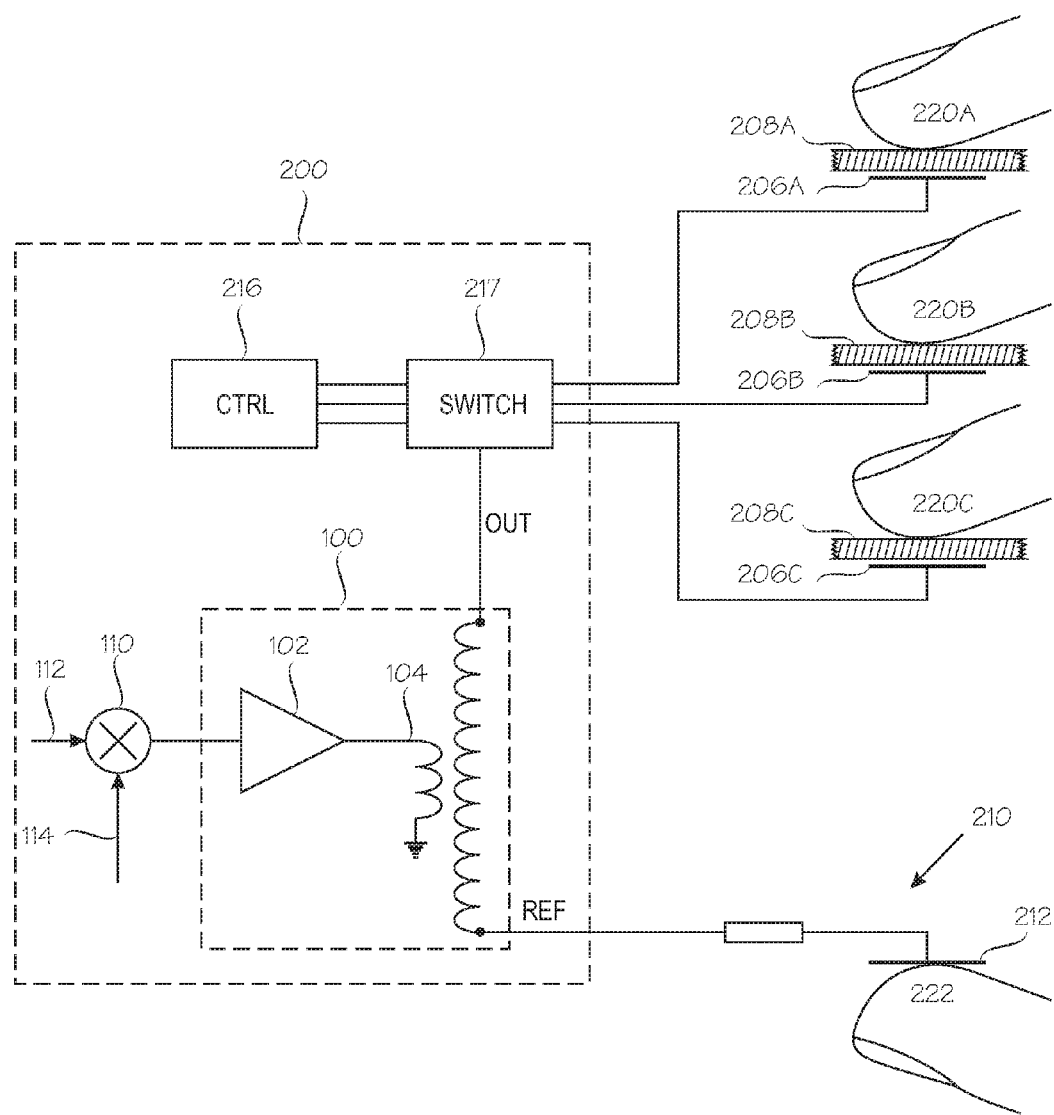

US 8,026,798 B2

TECHNIQUES FOR PRESENTING VEHICLE-RELATED INFORMATION

This application is a U.S. National Stage Filing under 35 U.S.C. 371 from International Application No. PCT/FI2008/050550, filed Oct. 3, 2008 and published in English as WO 2010/037894 on Apr. 8, 2008, which application and publication are incorporated herein by reference in their entireties.

FIELD OF THE INVENTION

The invention relates to methods and apparatuses for presenting vehicle-related information. An illustrative but non-exhaustive list of appropriate vehicles includes cars, trucks, yachts and ships.

BACKGROUND OF THE INVENTION

Today's cars or other vehicles produce large amounts of vehicle-related information. A prime example of such information is the vehicle's speed. Vehicle speed information is normally displayed by a speedometer, which is a visual instrument. A problem with visual instruments is that they prevent, at least temporarily, the driver from focusing their eyes on the road, when the driver needs to read the speed information. Attempts to solve this problem have been based on constant-speed controllers, speed limiters and aural alert systems, all of which exhibit certain problems. For instance, the constant-speed controllers keeps the vehicle speed constant even when the driver falls asleep. Speed limiters prevent the driver from exceeding the preset speed even in cases where this might be desirable to avoid an accident. Aural alert systems are susceptible of being deactivated as the driver may find such systems too distracting.

BRIEF DESCRIPTION OF THE INVENTION

An object of the invention is to develop an information presentation apparatus and method that alleviates one or more of the problems identified above. The object of the invention is achieved by methods and apparatuses as defined in the attached independent claims. The present patent specification and the dependent claims relate to specific embodiment and features which are not mandatory but provide additional benefits.

An aspect of the present invention is a method for presenting a time-variant information element in a vehicle which has a steering wheel. The method comprises
  providing the steering wheel with one or more remotely and individually controllable tactile pads, each of which is operable to produce a tactile sensation in response to a respective pad output signal, wherein the one or more pad output signals are produced by a controller, and wherein the one or more tactile pads are positioned on the steering wheel such that they can be touched by at least one hand of the vehicle driver while driving the vehicle;
  determining the time-variant information element to be presented and applying the determined time-variant information element to the controller;
  encoding the determined time-variant information element by the controller into temporal variations of the one or more pad output signals.

The act of providing the steering wheel with the one or more remotely and individually controllable tactile pads can be accomplished by attaching or integrating the tactile pad(s) on or into the steering wheel. Alternatively, the tactile pad(s) can be mounted on a separate support device such that the tactile pad(s) can be reached by the vehicle driver's finger(s) while the driver's hands are on the steering wheel.

By means of the invention, the time-variant information element is presented to the driver via a tactile sensation.

An illustrative but non-exhaustive list of appropriate time-variant information elements comprises the vehicle's speed; an indication of a current speed limit or a change of the current speed limit, wherein the current speed limit may be indicated by a navigation device in the vehicle or coupled to it; a deviation of the vehicle's speed from the current speed limit; a deviation from a normal range in one or more running parameters of an engine of the vehicle; or the like.

Another aspect of the invention is an apparatus for implementing the above method. The apparatus comprises one or more remotely and individually controllable tactile pads, which produce the tactile sensation under control of the controller. The tactile pads are positioned or adapted to be positioned on the steering wheel such that they can be touched by at least one hand of the vehicle driver while driving the vehicle. The apparatus further comprises means for determining the time-variant information element to be presented and for applying the determined time-variant information element to the controller; and means for encoding the determined time-variant information element by the controller into temporal variations of the one or more pad output signals.

Even one tactile pad may provide the driver with useful information. For instance, the tactile pad may draw the driver's attention to a visual information display which presents a more detailed information. Normally when a vehicle's information presentation system needs to alert the driver, an acoustic alert is used. But acoustic alerts may needlessly alert the passengers, and they are ineffective if the driver is hearing-impaired. A single tactile pad positioned next to the driver's hand, when the hand is in normal driving position, may alert the driver without distracting other persons in the vehicle.

More detailed information can be presented by using multiple tactile pads. In one specific embodiment the apparatus comprises a plurality of remotely and individually controllable tactile pads, and the encoding comprises encoding the information element to a simultaneous set of states of the tactile pads. This means that the information element to be presented is not presented by any individual tactile pad but by the combination of the tactile pads.

Considering the fact that normal healthy persons have ten fingers, a steering wheel provided with 10 individually controllable tactile pads could, in theory, display $2^{10}=1024$ different state combinations, assuming that each tactile pad has two states (activated or deactivated). Yet it is hardly realistic to assume that a typical driver could mentally decipher the meanings of such a large number of state combinations. Accordingly, a more practical approach involves binary encoding the information element to be presented into a small number of tactile pads, such as two, three or four. For example, two tactile pads might encode four different speed ranges, such as 0-5, 5-10, 10-15 and above 15 km/h above the current speed limit. If neither pad is activated, the vehicle's speed is not more than 5 km/h above the speed limit. If both pads are activated, the vehicle's speed exceeds the speed limit by more than 15 km/h.

Another practical approach involves an encoding scheme wherein the information element, such as vehicle speed, has a current value (eg 85 km/h) and a current range (eg 80-120 km/h) and the encoding comprises 1) assigning a portion of the current range to each tactile pad; 2) activating the one of the tactile pads whose assigned range includes the current value of the information element. If ten tactile pads are used as a linear array, which is roughly analogous to a discrete analogue indicator, each tactile pad corresponds to a portion of 4 km/h of the range (120−80=40 km/h). Thus in a simple implementation in which only one tactile pad is indicated at a time, the resolution of a linear array is the range (here: 40 km/h) divided by the number of tactile pads (here: 10).

The resolution can be doubled by means of an embodiment wherein the encoding further comprises activating two neighbouring tactile pads simultaneously if the current value of the information element is within some predetermined margin from the average value of the union of the velocity ranges associated to the two neighbouring tactile pads. In the previous example wherein each tactile pad corresponds to a range portion of 4 km/h, if the vehicle's determined speed differs from the average value of the union of the velocity ranges associated to the neighbouring tactile pads, the two neighbouring tactile pads can be activated. In this implementation, one specific tactile pad, positioned under one finger, may be activated if the vehicle's speed is 80, 81, 82 or 83 km/h. Its next neighbour may be activated if the vehicle's speed is 84, 85, 86 or 87 km/h. Simultaneous activation of these two tactile may indicate that the vehicle's speed is 83 or 84 km/h.

It is beneficial to provide the apparatus with one or more static formations, such as humps, peaks, ridges or notches, positioned so as to guide the vehicle driver's fingers to the tactile pads. By indicating the positions of the tactile pads, the static formations inherently indicate the value ranges assigned to the tactile pads. The static formations may be spatially distinct from the tactile pads or partially overlap some or all of them.

The tactile pads may indicate the information element continuously or for a limited, predetermined period of time in response to a detected, sufficiently large change of the value of the information element and/or a detection of a predetermined act of the vehicle driver.

The one or more tactile pads may be implemented as mechanical stimulus-generating devices, such as micro-solenoids, or they may be implemented as capacitive electrosensory interface devices. Yet further, the one or more tactile pads may be implemented as a device having means for moving a formation to one of multiple different positions according to the determined time-variant information element.

An illustrative but non-exhaustive list of appropriate time-variant information elements to be indicated by embodiments of the present invention includes: the vehicle's speed; indication of a current speed limit or a change thereof, as determined by a navigation device; a deviation of the vehicle's speed from the current speed limit, wherein the current speed limit is determined by a navigation device; and a deviation from a normal range in one or more running parameters of an engine of the vehicle. Some kind of hysteresis may be employed to provide a reasonably stable indication.

BRIEF DESCRIPTION OF THE DRAWINGS

In the following the invention will be described in greater detail by means of specific embodiments with reference to the attached drawings, in which FIGS. 1 through 15 relate to a capacitive electro-sensory interface ("CEI") which can be used as one embodiment of a remotely and individually controllable tactile pad. FIGS. 16A through 17B relate to placement of the tactile pads on or near a steering wheel for a vehicle, and FIG. 18 relates to electromechanical implementations of the controllable tactile pad. Specifically:

FIG. 1 illustrates the operating principle of a capacitive electro-sensory interface ("CEI");

FIG. 2 illustrates an embodiment of the CEI;

FIG. 3 shows an enhanced embodiment with multiple independently-controllable electrodes;

FIGS. 16A to 16C schematically illustrate placement of tactile pads in a steering wheel;

FIGS. 17A and 17B schematically illustrate embodiments in which static formations, such as bumps or ridges, spatially coincide with the tactile pads.

DETAILED DESCRIPTION OF SPECIFIC EMBODIMENTS

Figure 4:
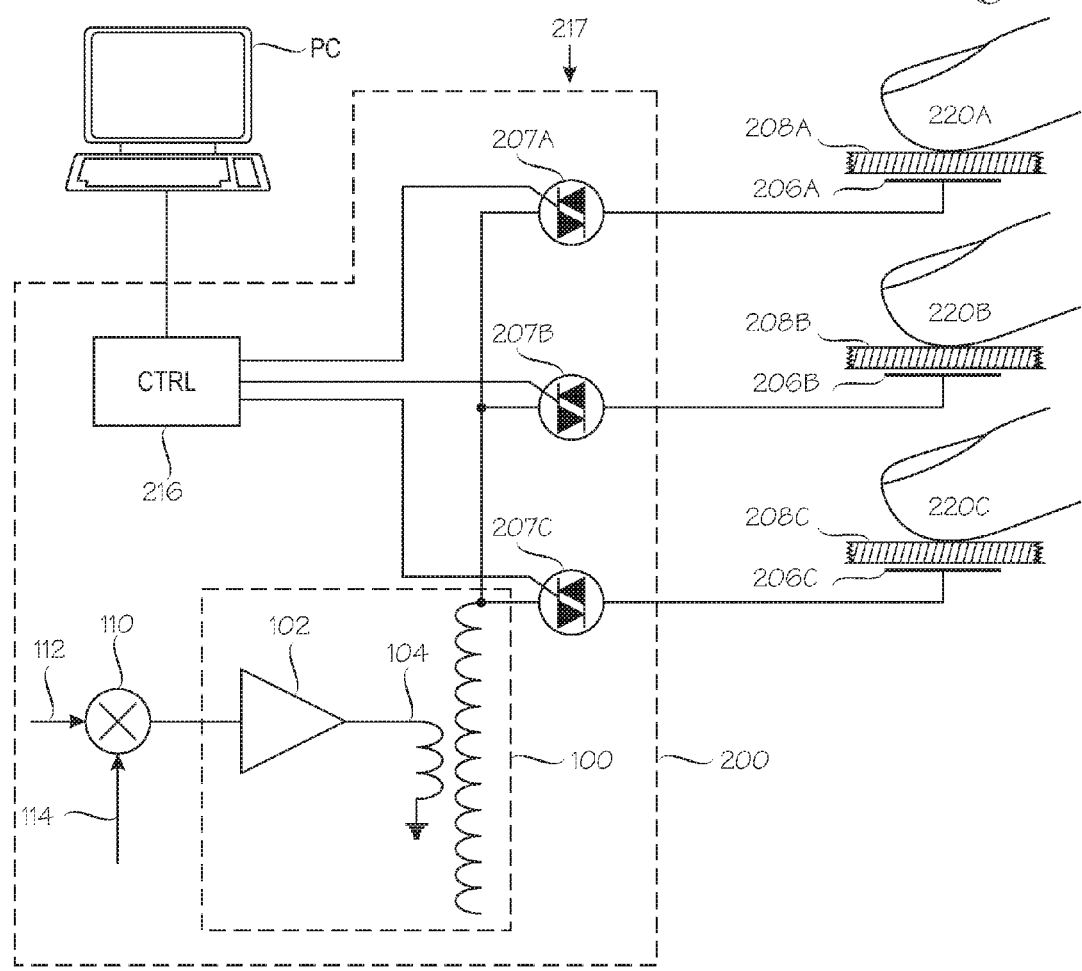
FIG. 4 shows a specific implementation of the embodiment shown in FIG. 3.

FIGS. 1 through 15 relate to the operation and implementation of a capacitive electro-sensory interface ("CEI") which can be employed in the inventive touch screen interface.

FIG. 1 illustrates the operating principle of the CEI. Reference numeral 100 denotes a high-voltage amplifier. The output of the high-voltage amplifier 100, denoted OUT, is coupled to an electrode 106 which is insulated against galvanic contact by an insulator 108 which comprises at least one insulation layer or member. Reference numeral 120 generally denotes a body member to be stimulated, such as a human finger. Human skin, which is denoted by reference numeral 121, is a relatively good insulator when dry, but the CEI provides a relatively good capacitive coupling between the electrode 106 and the body member 120. The capacitive coupling is virtually independent from skin conditions, such as moisture. The inventors' hypothesis is that the capacitive coupling between the electrode 106 and the body member 120 generates a pulsating Coulomb force. The pulsating Coulomb force stimulates vibration-sensitive receptors, mainly those called Pacinian corpuscles which reside under the outermost layer of skin in the ipodermis 121. The Pacinian corpuscles are denoted by reference numeral 122. They are shown schematically and greatly magnified.

The high-voltage amplifier 100 is driven by an input signal IN which results in a substantial portion of the energy content of the resulting Coulomb forces to reside in a frequency range to which the Pacinian corpuscles 122 are sensitive. For humans this frequency range is between 10 Hz and 1000 Hz, preferably between 50 Hz and 500 Hz and optimally between 100 Hz and 300 Hz, such as about 240 Hz. The frequency response of the Pacinian corpuscles is further discussed in connection with FIGS. 5 and 6.

It should be understood that, while "tactile" is frequently defined as relating to a sensation of touch or pressure, the electrosensory interface according to the present CEI, when properly dimensioned, is capable of creating a sensation of vibration to a body member even when the body member 120 does not actually touch the insulator 108 overlaying the electrode 106. This means that unless the electrode 106 and/or insulator 108 are very rigid, the pulsating Coulomb forces between the electrode 106 and body member 120 (particularly the Pacinian corpuscles 122) may cause some slight mechanical vibration of the electrode 106 and/or insulator 108, but the method and apparatus according to the CEI are capable of producing the electrosensory sensation independently of such mechanical vibration.

The high-voltage amplifier and the capacitive coupling over the insulator 108 are dimensioned such that the Pacinian corpuscles or other mechanoreceptors are stimulated and an electrosensory sensation (a sensation of apparent vibration) is produced. For this, the high-voltage amplifier 100 must be capable of generating an output of several hundred volts or even several kilovolts. In practice, the alternating current driven into the body member 120 has a very small magnitude and can be further reduced by using a low-frequency alternating current.

FIG. 2 illustrates an apparatus which implements an illustrative embodiment of the present CEI. In this embodiment the high-voltage amplifier 100 is implemented as a current amplifier 102 followed by a high-voltage transformer 104. In the embodiment shown in FIG. 2, the secondary winding of the high-voltage transformer 104 is in a more or less flying configuration with respect to the remainder of the apparatus. The amplifier 100, 102 is driven with a modulated signal whose components are denoted by 112 and 114. The output of the high-voltage amplifier 100 is coupled to an electrode 106 which is insulated against galvanic contact by the insulator 108. Reference numeral 120 generally denotes a member to be stimulated, such as a human finger. Human skin, which is denoted by reference numeral 121, is a relatively good insulator when dry, but the CEI provides a relatively good capacitive coupling between the electrode 106 and the electrically conductive tissue underneath the skin surface 121. Mechanoreceptors, such as the Pacinian corpuscles 122, reside in this conductive tissue. In FIGS. 1 and 2, the Pacinian corpuscles 122 are shown schematically and greatly magnified.

A benefit of the capacitive coupling between the electrode 106 and the electrically conductive tissue underneath the skin surface, which is known as the Corneus Layer and which contains the Pacinian corpuscles 122, is that the capacitive coupling eliminates high local current densities to finger tissue, which would result from contact that is conductive at direct current.

It is beneficial, although not strictly necessary, to provide a grounding connection which helps to bring the subject to be stimulated, such as the user of the apparatus, closer to a well-defined (non-floating) potential with respect to the high-voltage section of the apparatus. In the embodiment shown in FIG. 2, the grounding connection, denoted by reference numeral 210, connects a reference point REF of the high-voltage section to a body part 222 which is different from the body part(s) 120 to be stimulated. In the embodiment shown in FIG. 2, the reference point REF is at one end of the secondary winding of the transformer 104, while the drive voltage for the electrode(s) 206A, 206B, 206C is obtained from the opposite end of the secondary winding.

In an illustrative implementation, the apparatus is a hand-held device which comprises a touch display activated by finger(s) 120. The grounding connection 210 terminates at a grounding electrode 212. An illustrative implementation of the grounding electrode 212 is one or more ground plates which are arranged such that they are conveniently touched one hand 222 of the user while the apparatus is manipulated by the other hand. The ground plate(s) may be positioned on the same side of the apparatus with the touch display and next to the touch display, or it/they may be positioned on adjacent or opposite side(s) from the side which comprises the touch display, depending on ergonomic considerations, for example.

In real-world apparatuses, the coupling 210 between the reference point REF and the non-stimulated body part 222 may be electrically complex. In addition, hand-held apparatuses typically lack a solid reference potential with respect to the surroundings. Accordingly, the term "grounding connection" does not require a connection to a solid-earth ground. Instead the grounding connection means any connection which helps to decrease the potential difference between the reference potential of the apparatus and a second body member distinct from the body member(s) to be stimulated. This definition does not rule out any capacitive parallel or stray elements, so long as the grounding connection 210 helps bring the user of the apparatus, along with the non-stimulated body part 222, to a potential which is reasonably well defined with respect to the high-voltage section of the apparatus. A capacitive grounding connection will be discussed in connection with FIG. 12. In the present context, the reasonably well-defined potential should be understood in view of the voltage OUT which drives the electrode(s) 206A, 206B, 206C. If the electrode drive voltage OUT is, say, 1000 V, a potential difference of, say, 100 V, between the users body and the reference point REF may not be significant.

The non-capacitive coupling 210 between the reference point REF of the high-voltage section and the non-stimulated body part 222 greatly enhances the electro-sensory stimulus experienced by the stimulated body part 120. Conversely, an equivalent electro-sensory stimulus can be achieved with a much lower voltage and/or over a thicker insulator when the non-capacitive coupling 210 is being used.

The amplifier 100, 102 is driven with a high-frequency signal 112 which is modulated by a low-frequency signal 114 in a modulator 110. The frequency of the low-frequency signal 114 is such that the Pacinian corpuscles, which reside in the electrically conductive tissue underneath the skin surface, are responsive to that frequency. The frequency of the high-frequency signal 112 is preferably slightly above the hearing ability of humans, such as 18 to 25 kHz, more preferably between about 19 and 22 kHz. If the frequency of the signal 112 is within the audible range of humans, the apparatus and/or its drive circuit may produce distracting sounds. On the other hand, if the frequency of the signal 112 is far above the audible range of humans, the apparatus drives more current into the member 120. A frequency of about 20 kHz is advantageous in the sense that components designed for audio circuits can generally be used, while the 20 kHz frequency is inaudible to most humans. Experiments carried out by the inventors suggest that such modulation is not essential for the CEI. Use of a high-frequency signal with low-frequency modulation, such as the one schematically shown in FIG. 2, as opposed to a system which relies on the low-frequency signal alone, provides the benefit that the relatively high alternating voltage (a few hundred volts or a few kilovolts) can be generated with a relatively small transformer 104.

Terms like frequency or kHz should not be understood such that the high- or low-frequency signals 112, 114 are restricted to sinusoidal signals, and many other waveforms can be used, including square waves. The electrical components, such as the modulator 110, amplifier 102 and/or transformer 104 can be dimensioned such that harmonic overtones are suppressed. The inventors have discovered that pulses with durations of 4 ms (approximately one half-cycle of the low-frequency signal) or longer can be readily detected and with a practical insulator thickness the peak-to-peak voltage in the electrode 106 needs to be at least about 750 V. Unloaded peak-to-peak voltage measured in the electrode 106 should be in the range of approximately 750 V-100 kV. Near the lower limit of this voltage range, the insulator thickness may be 0.05-1 mm, for example. As material technology and nanotechnology develop, even thinner durable insulating surfaces may become available. This may also permit a reduction of the voltages used.

The elements of FIGS. 1 and 2 described so far produce a steady-state electrosensory sensation as long as the body member, such as the finger 120, is in the vicinity of the electrode 106. In order to convey useful information, the electrosensory sensation must be modulated. In some simple embodiments, such modulation can be implemented by positioning the electrode 106 such that useful information is conveyed by the fact that the finger 120 can sense the presence of the electrode 106. For example, the electrode 106 can be positioned over a switch, or in the vicinity of it, such that the switch can be detected without having to see it.

In other embodiments, such information-carrying modulation can be provided by electronically controlling one or more operating parameters of the inventive apparatus. The information-carrying modulation should not be confused with the modulation of the high-frequency signal 112 by the low-frequency signal 114, the purpose of which is to reduce the size of the transformer 104. In the schematic drawing shown in FIG. 2, such information-carrying modulation is provided by controller 116, which controls one or more of the operating parameters of the inventive apparatus. For instance, the controller 116 may enable, disable or alter the frequency or amplitude of the high- or low-frequency signals 112, 114, the gain of the amplifier 102, or it may controllably enable or disable the power supply (not shown separately) or controllably break the circuit at any point.

FIG. 3 shows an enhanced embodiment of the inventive apparatus with multiple independently-controllable electrodes. In FIG. 3, elements with reference numerals less than 200 have been described in connection with FIGS. 1 and 2, and a repeated description is omitted. This embodiment comprises multiple independently-controllable electrodes 206A, 206B and 206C, of which three are shown but this number is purely arbitrary. Reference numeral 216 denotes an implementation of a controller which controls a switch matrix 217 which provides the high-voltage signal OUT to the electrodes 206A, 206B and 206C under control of the controller 216. The controller 216 may be responsive to commands from an external device, such as a data processing equipment (not shown separately).

A benefit of the embodiment shown in FIG. 3 is that virtually all the drive circuitry, including the high-voltage amplifier 100, controller 216, and switch matrix 217, can be integrated into a common enclosure which is denoted by reference numeral 200. In this embodiment only the electrodes 206A, 206B and 206C and a single connecting wire for each electrode are outside the enclosure 200. As stated earlier, the electrodes need to be nothing more than simple conducting or semi-conducting plates covered by appropriate insulators. Therefore the enclosure 200 can be positioned in virtually any convenient position because the only elements external to it are very simple electrodes and connecting wires (and, in some implementations a power supply, not shown separately).

Some prior art systems provide direct stimulation of nerves via galvanic current conduction to the outermost layer of the skin. Because of the galvanic current conduction, such systems require two electrodes to stimulate an area of skin. In contrast to such prior art systems, the embodiment described in connection with FIG. 3 involves multiple electrodes 206A, 206B and 206C, but each electrode alone stimulates a distinct area of skin, or more precisely, the mechanoreceptors, including the Pacinian corpuscles underlying the outermost layers of skin. Therefore a configuration of n electrodes conveys n bits of information in parallel.

FIG. 4 shows a specific implementation of the embodiment shown in FIG. 3. In this implementation the switch matrix 217 comprises a bank of triacs 207A, 207B and 207C, but other types of semiconductor switches can be used, including semiconductor relays. Conventional electromechanical relays can be used as well. In this embodiment the switches (triacs) 207A, 207B and 207C are positioned logically after the transformer 104, ie, in the high-voltage circuitry. This implementation requires high-voltage switches (several hundred volts or several kilovolts) but it provides the benefit that the remainder of the circuitry, including the elements 100 through 114, can serve all of the electrodes 206A, 206B and 206C. As shown in FIG. 4, the controller 216 may be connectable to a data processing equipment, an example of which is shown here as a personal computer PC.

Figure 5:
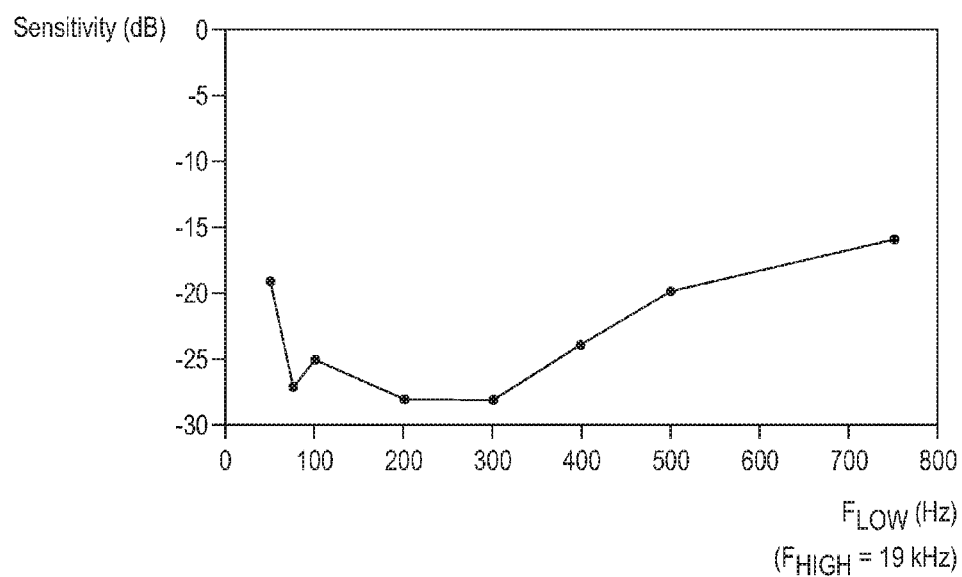
FIG. 5 is a graph which schematically illustrates the sensitivity of a test subject to sensations produced by the inventive capacitive electrosensory interface at various frequencies.

FIG. 5 is a graph which schematically illustrates the sensitivity of a randomly selected test subject to sensations produced by an apparatus substantially similar to the one shown in FIG. 2. The x-axis of the graph shows frequency of the low-frequency signal (item 114 in FIG. 2) multiplied by two, while the y-axis shows the amplitude required to detect an electrosensory stimulation. The amplitude scale is relative. The small dip at 75 Hz may be a measurement anomaly. The reason for placing the doubled low-frequency signal on the x-axis is that the Coulomb forces between the electrode 106 and the body member 120 have two intensity peaks for each cycle of a sinusoidal low-frequency signal, as will be schematically illustrated in connection with FIG. 6.

The relative sensitivity at various frequencies is remarkably similar to the one published in section 2.3.1 (FIG. 2.2) of Reference document 1. Reference document 1 relates to vibrotactile (mechanical) stimulation of skin, but the similarity of the frequency response shown in FIG. 5 to the one published in Reference 1 suggests that the present CEI operates such that the electrode 106 and the sensitive member 120 (see FIG. 1) form a capacitor over the insulator 108, and in that capacitor the oscillating Coulomb forces are converted to mechanical vibrations which are sensed by mechanoreceptors, including the Pacinian corpuscles. The inventors have also studied an alternative hypothesis wherein the Pacinian corpuscles are stimulated by current flowing through them, but this hypothesis does not explain the observations as well as the one which is based on Coulomb forces acting on the Pacinian corpuscles. However, the technical CEI described herein does not depend on the correctness of any particular hypothesis attempting to explain why the CEI operates the way it does.

Figure 6:
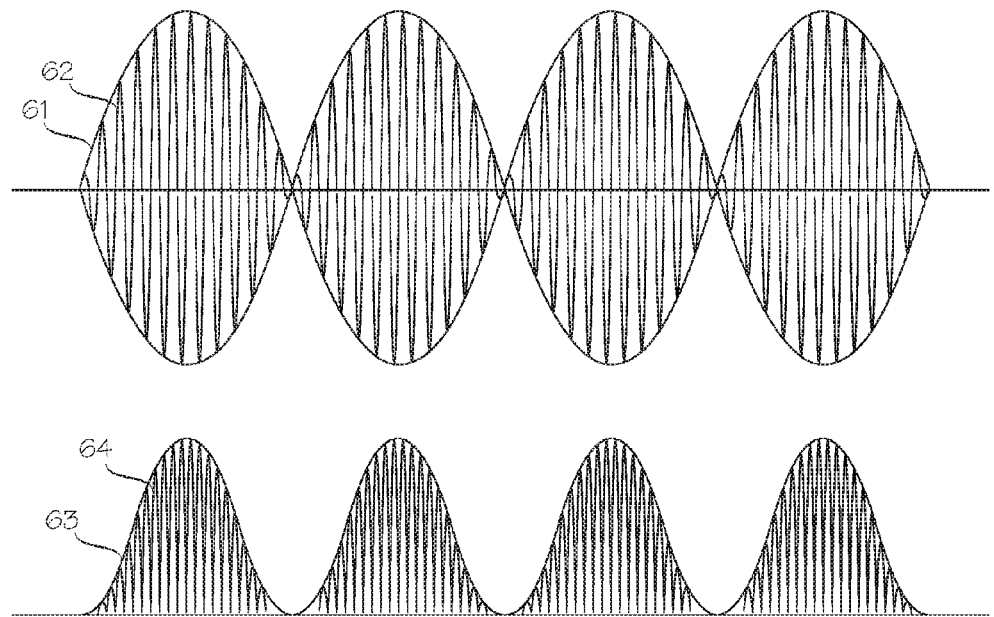
FIG. 6 is a graph which further clarifies the operating principle of the CEI.

FIG. 6 is a graph which further clarifies the operating principle of the CEI and the interpretation of frequencies in connection with the present CEI. Reference numeral 61 denotes the low-frequency input signal to the modulator 110 (shown as item 114 in FIG. 2). Reference numeral 62 denotes the output of the modulator, le, the high-frequency input signal as modulated by the low-frequency input signal.

Reference numerals 63 and 64 denote the resulting Coulomb forces in the capacitive coupling between the electrode 106 and the body member 120 over the insulator 108. Because the two sides of the capacitive coupling have opposite charges, the Coulomb force between the two sides is always attractive and proportional to the square of the voltage. Reference numeral 63 denotes the actual Coulomb force while reference numeral 64 denotes its envelope. The envelope 64 is within the range of frequencies to which the Pacinian corpuscles are sensitive, but because the Coulomb force is always attractive, the envelope 64 has two peaks for each cycle of the modulator output signal 62, whereby a frequency-doubling effect is produced. Because the Coulomb force is proportional to the square of the voltage, any exemplary voltages disclosed herein should be interpreted as effective (RMS) values in case the voltages are not sinusoidal.

The statement that the two sides of the capacitive coupling have opposite charges whereby the Coulomb force is always attractive holds for a case in which the apparatus and the body member to be stimulated are at or near the same potential. High static charges can cause deviations from this ideal state of affairs, which is why some form of grounding connection between a reference potential of the high-voltage source and the body element other than the one(s) to be stimulated is recommended, as the grounding connection helps to lower the potential differences between the apparatus and its user.

The CEI can be implemented as part of an input/output peripheral device which is connectable to a data processing equipment. In such a configuration the data processing equipment can provide prompting and/or feedback via electrically-controllable electrosensory sensation.

Figure 7A:
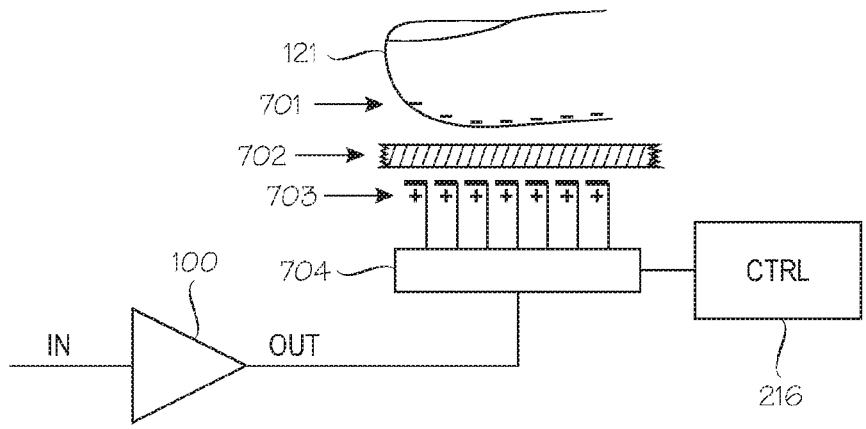
FIGS. 7A and 7B show an implementation of the CEI wherein the strength of the capacitive coupling is adjusted by electrode movement.
Figure 7B:
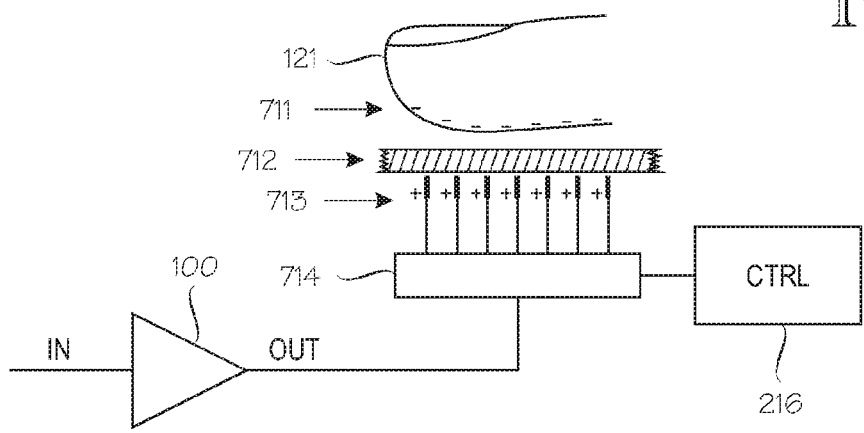

FIGS. 7A and 7B show implementations of the CEI wherein the strength of the capacitive coupling is adjusted by electrode movement. Generation of the electric field, and its variation as necessary, is effected via a set of electrodes 704 which comprises individual electrodes 703. The individual electrodes 703 are preferably individually controllable, wherein the controlling of an electrode affects its orientation and/or protrusion. FIG. 7A shows an implementation wherein a group of electrodes 703 are oriented, via the output signal from the controller 216, such that the electrodes 703 collectively form a plane under the insulator 702. In this situation the high-voltage current (DC or AC) from the high-voltage amplifier 100 to the electrodes 703 generates an opposite-signed charge of sufficient strength to a body member (eg the finger 120) in close proximity to the apparatus. A capacitive coupling between the body member and the apparatus is formed over the insulator 702, which may give rise to a sensory stimulus.

FIG. 7B shows the same apparatus shown in FIG. 7A, but in this case the strength of the capacitive coupling generated with the current from the high-voltage amplifier 100 is minimized by orienting the electrodes (now shown by reference numeral 714) such that they do not form a plane under the insulator 702. In some implementations of the present invention, the electric field alternating with a low frequency can be generated by alternating the state of the apparatus between the two states shown in FIGS. 7A and 7B. The frequency of the state alternation can be in the order of several hundred, eg 200 to 300 full cycles per second.

Figure 8:
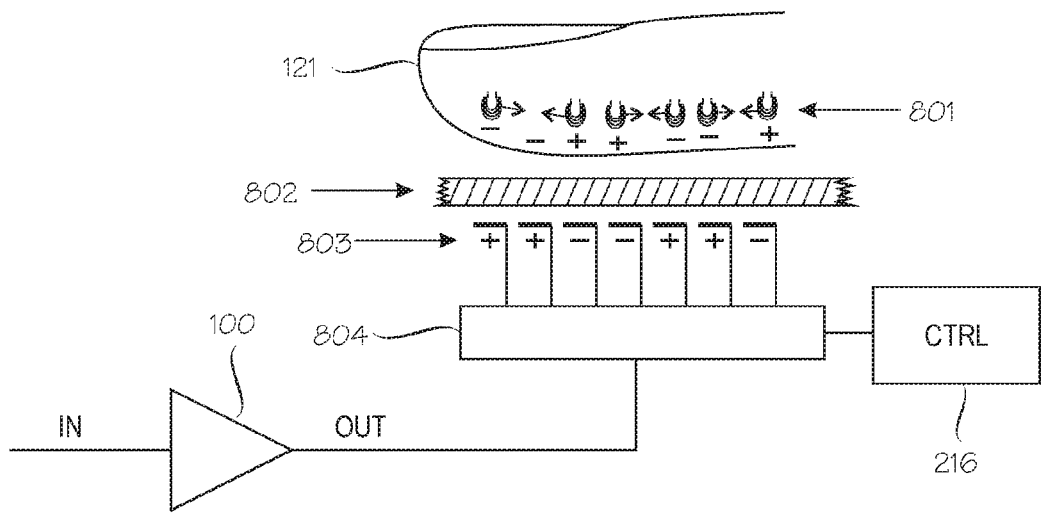
FIG. 8 shows an implementation of the CEI wherein the charges of different electrodes have opposite signs.

FIG. 8 shows an implementation of the CEI wherein the individual electrodes 803 in the set of electrodes 804 may have charges of opposite signs. The charges of individual electrodes 803 may be adjusted and controlled via the controller 216. The individual electrodes 803 may be separated by insulator elements 806, so as the prevent sparking or shorting between the electrodes. The capacitive coupling between the CEI and the body member proximate to it may give rise to areas having charges with opposite signs 801. Such opposing charges are mutually attractive to one another. Hence it is possible that Coulomb forces stimulating the Pacinian corpuscles may be generated not only between the CEI and the body member but between infinitesimal areas within the body member itself.

Figure 9:
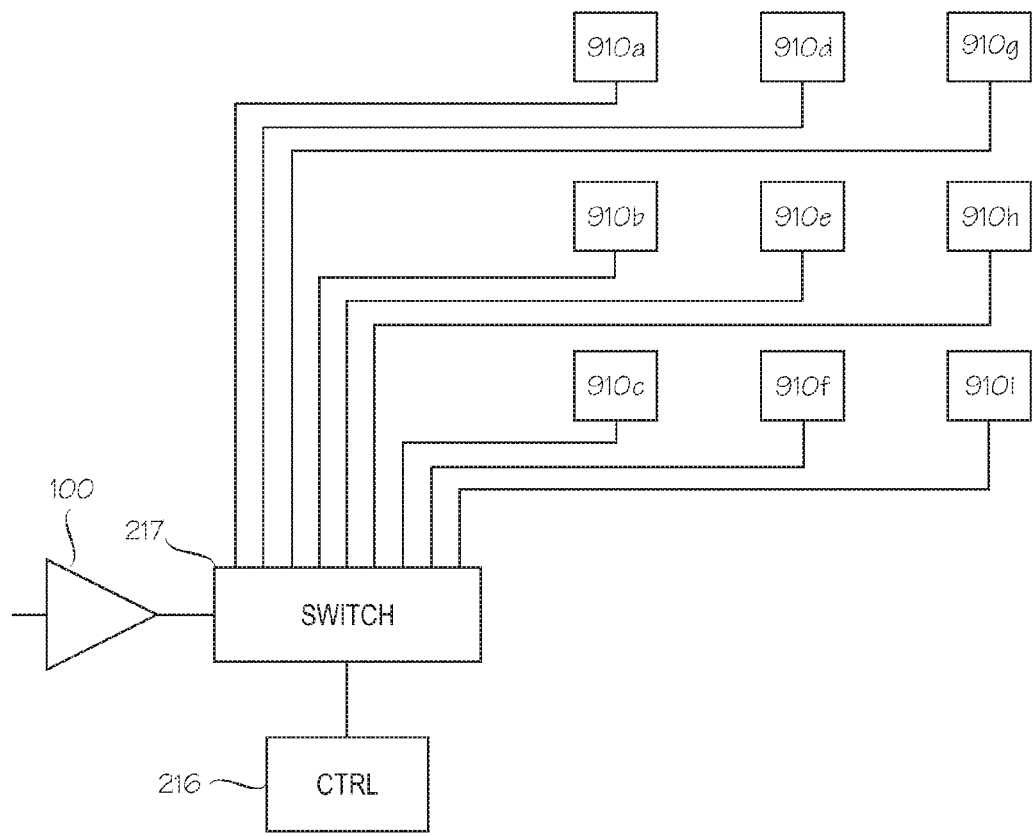
FIG. 9 shows an implementation of the CEI wherein a group of electrodes are organized in the form of a matrix.

FIG. 9 shows an implementation of the CEI wherein a group of individually controllable electrodes 910a through 910i are organized in the form of a matrix. Such a matrix can be integrated into a touch screen device, for example. Since the CEI described above does not require direct connection (touching) between the CEI and a body member of its user, the electrodes of the CEI apparatus can be positioned behind the touch screen, wherein "behind" means the side of the touch screen opposite to the side facing the user during normal operation. Alternatively, the electrodes can be very thin and/or transparent, whereby the electrodes can overlay the touch screen on the side normally facing the user. The electric charges, which are conducted from the high-voltage amplifier 100 to the electrodes 910a through 910i via the switch array 217, may all have similar signs or the charges conducted to different electrodes may have different signs, as illustrated in connection with FIG. 8. For instance, the controller 216 may control the switches in the switch array individually, or certain groups may form commonly-controllable groups. The surface of an individual electrode and/or its associated insulator can be specified according to the intended range of operations or applications. The minimum practical area is about 0.01 cm$^2$, while the practical maximum is roughly equal to the size of a human hand. It is expected that surface areas between 0.1 and 1 cm$^2$ will be found most usable in practice.

The matrix of electrodes 910a through 910i and the switch array 217 provide a spatial variation of the electro-sensory stimulation. In other words, the sensory stimulation provided to the user depends on the location of the user's body member, such as a finger, proximate to the CEI apparatus which is integrated to the inventive touch screen. The spatially varying sensory stimulation provides the user with an indication of the layout of the touch-sensitive areas of the touch screen interface.

In addition to the spatially varying sensory stimulation, the controller 216 may direct the switch array 217 to produce a temporally varying (time dependent) electro-sensory stimulation, which can be used for a wide variety of useful effects. For instance, the temporally varying electro-sensory stimulation can be used to indicate a detected activation of a touch-sensitive area ("key press"). This embodiment address a common problem associated with prior art touch screen devices, namely the fact that a detection of a key press produces no tactile feedback. Prior art application-level programs used via touch screen devices may provide visual or aural feedback, but such types of feedback exhibit the various problems described earlier. In addition, production of the visual or aural feedback from the application-level program causes a burden on the programming and execution of those programs. In some implementations of the invention, an interface-level or driver-level program provides a tactile feedback from a detected activation of a touch-sensitive area by using the temporally and spatially variant electro-sensory stimulation, and such interface-level or driver-level programs can be used by any application-level programs. For example, the application-level programs can be coupled to the inventive touch screen interface via an application programming interface ("API") whose set of available functions includes the feedback generation described above.

The temporally and spatially variant electro-sensory stimulation can also be used to change the layout of the touch-sensitive areas "on the fly". In hindsight, this operation may be considered roughly analogous to changing the keyboard or keypad layout depending on the application program or user interface screen currently executed. However, when prior art touch screen devices change keyboard or keypad layout on the fly, the new layout must be somehow indicated to the user, and this normally requires that the user sees the touch screen device.

Some embodiments of the inventive touch screen device eliminate the need to see the touch screen device, assuming that the layout of the touch-sensitive areas is sufficiently simple. For instance, up to about two dozen different "key legends" can be indicated to the user by providing different patterns for the temporally and spatially variant electro-sensory stimulation. As used herein, the expression "key legend" refers to the fact that prior art touch screen devices, which produce no tactile feedback, normally produce visual cues, and these are commonly called "legends". In some embodiments of the present invention, the function of the key legends can be provided via different patterns. For instance, the following patterns can be identified with one fingertip: pulses with low, medium or high repetition rate; sweeps to left, right, up or down, each with a few different repetition rates; rotations clockwise or anti-clockwise, each with a few different repetition rates.

From the above, it is evident that the inventive electro-sensory interface can produce a large number of different touch-sensitive areas, each with a distinct "feel" (technically: a different pattern for the temporal and spatial variation of the electro-sensory stimulus). Hence the screen section of a conventional touch screen is not absolutely needed in connection with the present invention, and the term touch device interface should be interpreted as an interface device which, among other things, is suitable for applications commonly associated with touch screen devices, although the presence of the screen is not mandatory.

Moreover, the strength of the capacitive coupling between the inventive CEI and a body member of its user (or the capacitive coupling between an individual electrode or a group of electrodes and the user's body member) can be determined by direct or indirect measurements. This measurement information can be utilized in various ways. For instance, the strength of the capacitive coupling can indicate the body member's proximity to the electrode, or it can indicate touching the electrode by the body member. Such measurement functionality can be provided by a dedicated measurement unit (not shown) or it can be integrated into one of the blocks described earlier, such as the switch matrix 217. The switch matrix 217 (or the optional dedicated measurement unit) can send the measurement information to the controller 216 which can utilize it to vary the electric fields generated by the electrodes, by varying the voltage or frequency. In addition or alternatively the controller 216 may forward the measurement information, or some information processed from it, to a data processing equipment, such as the personal computer PC shown in FIG. 4.

Yet further two or more inventive touch device interfaces can be interconnected via some communication network(s) and data processing equipment. In such an arrangement, the electro-sensory stimulation provided to the users of the touch screen devices may be based on some function of all users' contribution to the proximity to their respective devices. In one illustrative example, such an interconnection of two (or more) touch screen devices can provide their users with tactile feedback whose strength depends on the sum of the areas of hands touch the touch-sensitive areas. This technique simulates a handshake whose strength reflects the sum of hand pressure exerted by both (or all) users. In another illustrative example, a music teacher might "sense" how a remotely located student presses the keys of a simulated piano keyboard.

Figure 10:
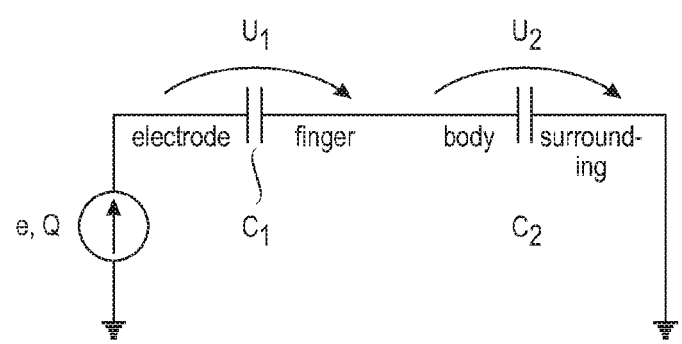
FIG. 10 illustrates distribution of an electric field-generating potential in capacitive couplings when the apparatus is grounded.

FIGS. 10 through 13 are equivalent circuits (theoretical models) which may be useful in dimensioning the parameters of the capacitive coupling. FIG. 10 illustrates distribution of an electric field-generating potential in capacitive couplings when the apparatus is grounded. The underlying theory is omitted here, and it suffices to say that in the arrangement shown in FIG. 10, the drive voltage e of an electrode is divided based on the ratio of capacitances C1 and C2, wherein C1 is the capacitance between the finger and the electrode and C2 is the stray capacitance of the user. The electric field experienced by the finger is caused by voltage U1:

$$U_1 = \frac{C_2}{C_1 + C_2} e$$

This voltage is lower than the drive voltage e from the voltage source. In a general case the reference potential of the apparatus may be floating, as will be shown in FIG. 11. This arrangement further decreases the electric field directed to the body member, such as finger.

Figure 12:
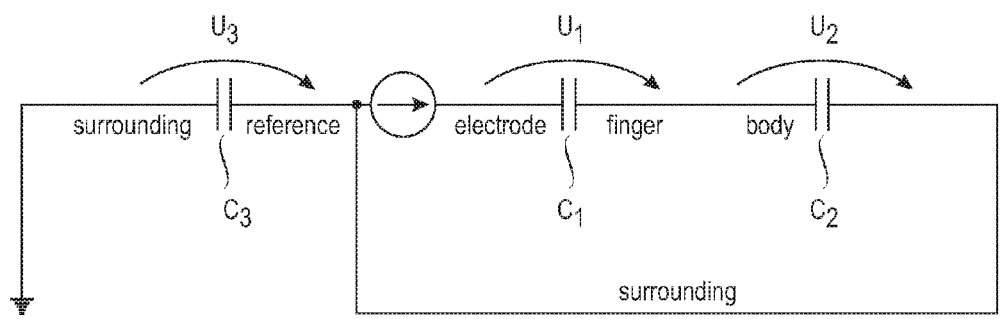
FIG. 12 illustrates distribution of an electric field-generating potential in capacitive couplings when the apparatus is floating and the user is sufficiently close to the apparatus and capacitively grounded to the ground (reference) potential of the apparatus.

For these reasons some embodiments of the invention aim at keeping the capacitance C1 low in comparison to that of C2. At least capacitance C1 should not be significantly higher than C2. Some embodiments aim at adjusting or controlling C2, for instance by coupling the reference potential of the apparatus back to the user, as shown in FIG. 12.

Further analysis of the actual value of capacitance C1 shows that it can be treated as a capacitance consisting of three series-coupled partial capacitances: $C_i$ of the insulator material, $C_a$ of the air gap between insulator and finger, and $C_s$ formed by the outmost skin layer that is electrically insulating the inner, conducting tissue from the environment. Each partial capacitance is given by:

$$C = \varepsilon \frac{S}{d}$$

Herein, e is the permittivity (dielectric constant) of the insulating material, S is the (effective) surface area and d is the distance between the surfaces of the capacitor. In a series arrangement of capacitances, the smallest one of the individual capacitances dominates the overall value of the total capacitance C1. When the body member does not touch the surface of the insulated electrode but only approaches it, the capacitive coupling is weak. Thus the value of C1 is small and mainly determined by the air gap, $C_a$. When the body member touches the surface, the effective air gap is small (approximately the height ridges of the fingerprint profile on the skin surface). As capacitance is inversely proportional to the distance of the conducting surfaces forming the capacitor, corresponding $C_a$ obtains a high value, and the value of C1 is determined by $C_i$ and $C_s$. Thus the effectiveness of the electro-sensory stimulus generation can be enhanced by appropriate selection of insulator material, particularly in terms of thickness and dielectric properties. For instance, selecting a material with a relatively high dielectric constant for the insulator reduces the electric field in the material but increases the electric field strength in the air gap and skin.

Furthermore, in applications where the surface is likely to be touched while the electro-sensory stimulation or response is given, the effectiveness of the electro-sensory stimulus generation can be enhanced by optimal selection of the material that will be touched by the body member. This is particularly significant in connection with insulators which are good volume insulators (insulators in the direction of the surface's normal) but less so in the direction along the surface.

An insulator's insulation capability along the surface may be negatively affected by surface impurities or moisture which have a negative effect on the apparent strength of the sensation felt by the body member to be stimulated. For instance, glass is generally considered a good insulator, but its surface tends to collect a thin sheet of moisture from the air. If the electrode of the CEI is insulated with glass, the electro-sensory effect is felt in close proximity (when there is still an air gap between body member and the glass surface). However, when the glass surface is touched, even lightly, the electro-sensory tends to weaken or disappear altogether. Coating the outer insulating surface with a material having a low surface conductance remedies such problems. The inventors speculate that if the surface having some surface conductivity is touched, it is the conductive layer on the surface that experiences the coulomb force rather than the body member touching the surface. Instead the touching body member acts as a kind of grounding for the conductive surface layer, for example via the stray capacitance of the body.

Figure 11:
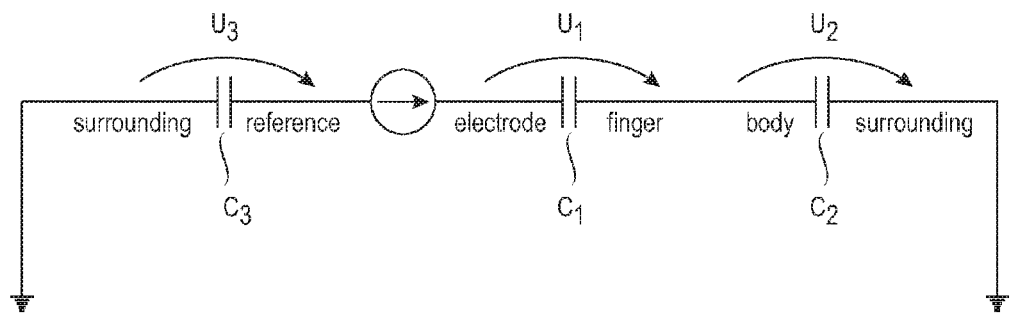
FIG. 11 illustrates distribution of an electric field-generating potential in capacitive couplings when the apparatus is floating (not grounded)

Instead of the measures described in connection with FIGS. 10 through 12, or in addition to such measures, stray capacitances can be controlled by arrangements in which several electrodes are used to generate potential differences among different areas of the touch screen surface. By way of example, this technique can be implemented by arranging the touch-sensitive surface of a hand-held device (eg the top side of the device) to a first potential, while the opposite side is arranged to a second potential, wherein the two different potentials can be the positive and negative poles of the device. Alternatively, a first surface area can be the electric ground (reference potential), while a second surface area is charged to a high potential.

Moreover, within the constraints imposed by the insulator layer(s), it is possible to form minuscule areas of different potentials, such as potentials with opposite signs or widely different magnitudes, wherein the areas are small enough that the user's body member, such as finger, is simultaneously subjected to the electric fields from several areas with different potentials.

Figure 13:
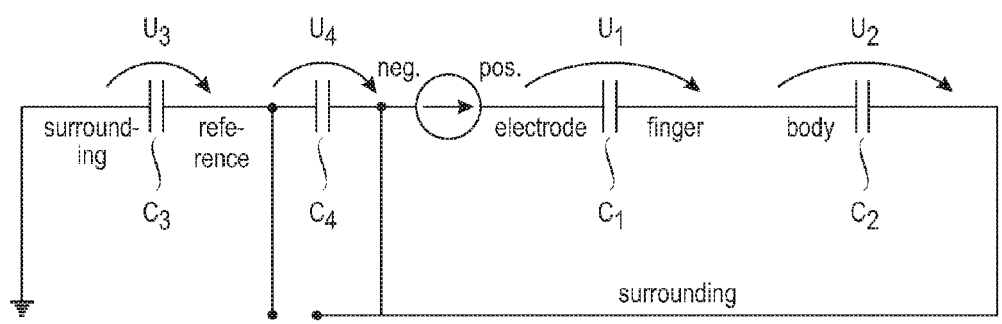
FIG. 13 shows an arrangement wherein capacitive couplings are utilized to detect touching.

FIG. 13 shows an embodiment in which the capacitive coupling is utilized to detect touching or approaching by the user's body member, such as finger. A detected touching or approaching by the user's body member can be passed as an input to a data processing device. In the embodiment shown in FIG. 13, the voltage source is floating. A floating voltage source can be implemented, via inductive or capacitive coupling and/or with break-before-make switches. A secondary winding of a transformer is an example of a simple yet effective floating voltage source. By measuring the voltage U4, it is possible to detect a change in the value(s) of capacitance(s) C1 and/or C2. Assuming that the floating voltage source is a secondary winding of a transformer, the change in capacitance(s) can be detected on the primary side as well, for example as a change in load impedance. Such a change in capacitance(s) serves as an indication of a touching or approaching body member.

In one implementation, the apparatus is arranged to utilize such indication of the touching or approaching body member such that the apparatus uses a first (lower) voltage to detect the touching or approaching by the body member and a second (higher) voltage to provide feedback to the user. For instance, such feedback can indicate any of the following: the outline of the/each touch-sensitive area, a detection of the touching or approaching body member by the apparatus, the significance of (the act to be initiated by) the touch-sensitive area, or any other information processed by the application program and which is potentially useful to the user.

Figure 14:
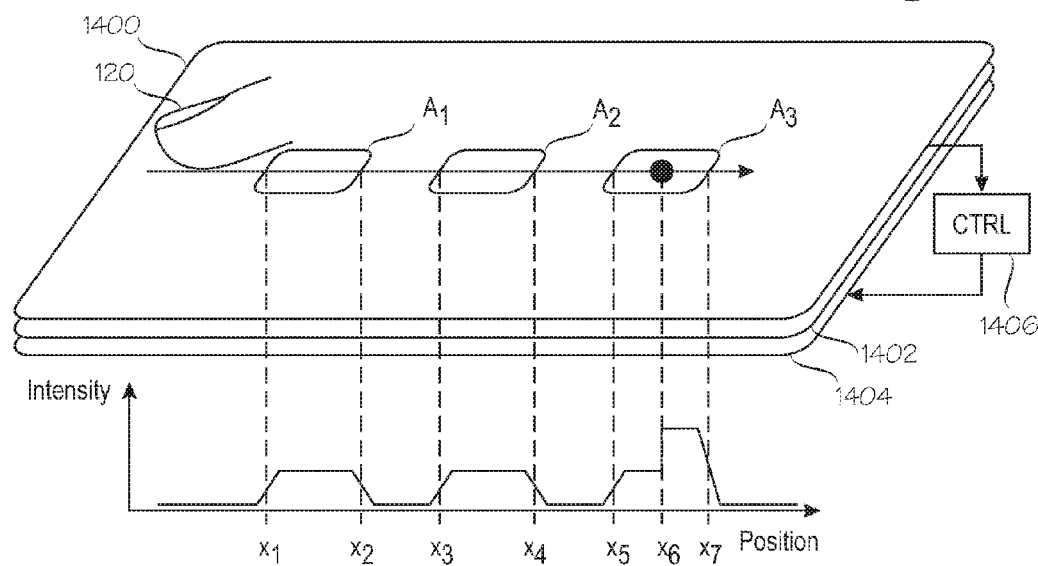
FIGS. 14 and 15 illustrate embodiments in which a single electrode and temporal variations in the intensity of the electro-sensory stimulus can be used to create illusions of a textured touch screen surface.

FIG. 14 schematically illustrates an embodiment in which a single electrode and temporal variations in the intensity of the electro-sensory stimulus can be used to create illusions of a textured touch screen surface. Reference numeral 1400 denotes a touch-sensitive screen which, for the purposes of describing the present embodiment, comprises three touch-sensitive areas $A_1, A_2$ and $A_3$. The approaching or touching by the touch-sensitive areas $A_1, A_2$ and $A_3$ of a user's finger 120 is detected by a controller 1406.

According to an embodiment of the invention, a conventional touch-sensitive screen 1400 can be complemented by an interface device according to the invention. Reference numeral 1404 denotes an electrode which is an implementation of the electrodes described in connection with previously-described embodiments, such as the electrode 106 described in connection with FIGS. 1 and 2. A supplemental insulator 1402 may be positioned between the touch-sensitive screen 1400 and the inventive electrode 1404, in case the touch-sensitive screen 1400 itself fails to provide sufficient insulation.

In addition to conventional touch-screen functionality, namely detection of approaching or touching by the touch-sensitive areas by the user's finger, the controller 1406 uses information of the position of the finger 120 to temporally vary the intensity of the electro-sensory stimulation invoked by the electrode 1404 on the finger 120. Although the intensity of the electro-sensory stimulation is varied over time, time is not an independent variable in the present embodiment. Instead, timing of the temporal variations is a function of the position of the finger 120 relative to the touch-sensitive areas (here: $A_1, A_2$ and $A_3$). Thus it is more accurate to say that the present embodiment is operable to cause variations in the intensity of the electro-sensory stimulation invoked by the electrode 1404 on the finger 120, wherein the variations are based on the position of the finger 120 relative to the touch-sensitive areas.

The bottom side of FIG. 14 illustrates this functionality. The three touch-sensitive area $A_1, A_2$ and $A_3$ are demarcated by respective x coordinate pairs $\{x_1, x_2\}$, $\{x_3, x_4\}$ and $\{x_5, x_7\}$. Processing in the y direction is analogous and a detailed description is omitted. The controller 1406 does not sense the presence of the finger, or senses the finger as inactive, as long as the finger is to the left of any of the touch-sensitive areas $A_1, A_2$ and $A_3$. In this example the controller 1406 responds by applying a low-intensity signal to the electrode 1404. As soon as the finger 120 crosses the x coordinate value $x_1$, the controller 1406 detects the finger over the first touch-sensitive area $A_1$ and starts to apply a medium-intensity signal to the electrode 1404. Between the areas $A_1$ and $A_2$ (between x coordinates $x_2$ and $x_3$), the controller again applies a low-intensity signal to the electrode 1404. The second touch-sensitive area $A_2$ is processed similarly to the first touch-sensitive area $A_1$, but the third touch-sensitive area $A_3$ is processed somewhat differently. As soon as the controller 1406 detects the finger 120 above or in close proximity to the area $A_3$, it begins to apply the medium-intensity signal to the electrode 1404, similarly to areas $A_1$ and $A_2$. But the user decides to press the touch screen 1400 at a point x6 within the third area $A_3$. The controller 1406 detects the finger press (activation of the function assigned to the area $A_3$) and responds by applying a high-intensity signal to the electrode 1404.

Thus the embodiment shown in FIG. 14 can provide the user with a tactile feedback which creates an illusion of a textures surface, although only a single electrode 1404 was used to create the electro-sensory stimulus. A residual problem is, however, that the user has to memorize the significance of the several touch-sensitive areas or obtain visual or aural information on their significance.

Figure 15:
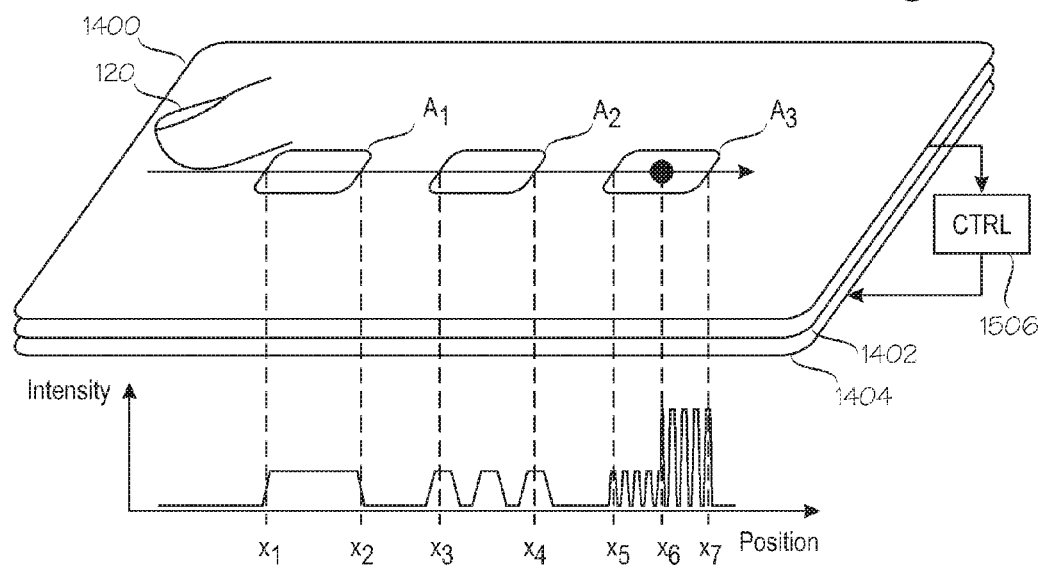

FIG. 15 shows a further enhanced embodiment from the one described in connection with FIG. 14. The embodiment shown in FIG. 15 uses different temporal variations of the intensity of the electro-sensory stimulus, wherein the different temporal variations provide the user with a tactile feedback indicating the significance of the touch-sensitive areas.

The operation of the embodiment shown in FIG. 14 differs from the one described in connection with FIG. 14 in that the controller, here denoted by reference numeral 1506, applies different temporal variations to the intensity of the signal to the electrode 1404. In this example, the first touch-sensitive area $A_1$ is processed similarly to the preceding embodiment, or in other words, the intensity of the electro-sensory stimulus depends only on the presence of the finger 120 in close proximity to the area $A_1$. But in close proximity to areas $A_2$ and $A_3$, the controller 1506 also applies temporal variations to the intensity of the electro-sensory stimulus. For example the significance (coarsely analogous with a displayed legend) of area $A_2$ is indicated by a pulsed electro-sensory stimulus at a first (low) repetition rate, while the significance of area $A_3$ is indicated by a pulsed electro-sensory stimulus at a second (higher) repetition rate. In an illustrative example, the three touch-sensitive areas $A_1$, $A_2$ and $A_3$ can invoke the three functions in a yes/no/cancel-type user interface, wherein the user can sense the positions of the user interface keys (here: the three touch-sensitive areas) and the indication of an accepted input only via tactile feedback. In other words, the user needs no visual or aural information on the positions of the touch-sensitive areas or on the selected function. The embodiment described in connection with FIG. 15 is particularly attractive in car navigators or the like, which should not require visual attention from their users.

In the embodiments shown in FIGS. 14 and 15, when the user's finger 120 has selected the function assigned to area $A_3$ and the controller CTRL 1406, 1506 generates the high-intensity electro-sensory stimulus via the electrode 1404, the high-intensity stimulus is sensed via any of the areas $A_1$, $A_2$ and $A_3$. In other words, if one finger of the user presses the area $A_3$, other finger(s) in close proximity to the other areas $A_2$ and/or $A_3$ will also sense the high-intensity stimulus. In cases where this is not desirable, the embodiments shown in FIGS. 14 and 15 can be combined with the multi-electrode embodiment disclosed in connection with FIG. 9, such that the signal to each of several electrodes (shown in FIG. 9 as items 910*a* through 910*i*) is controlled individually.

Figure 16A:
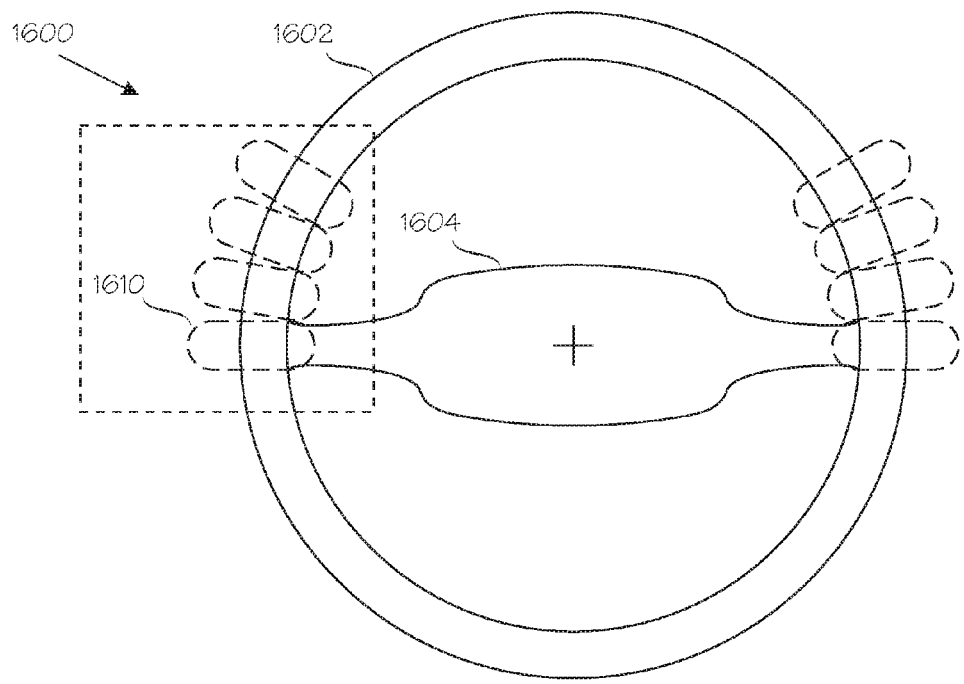
Figure 16B:
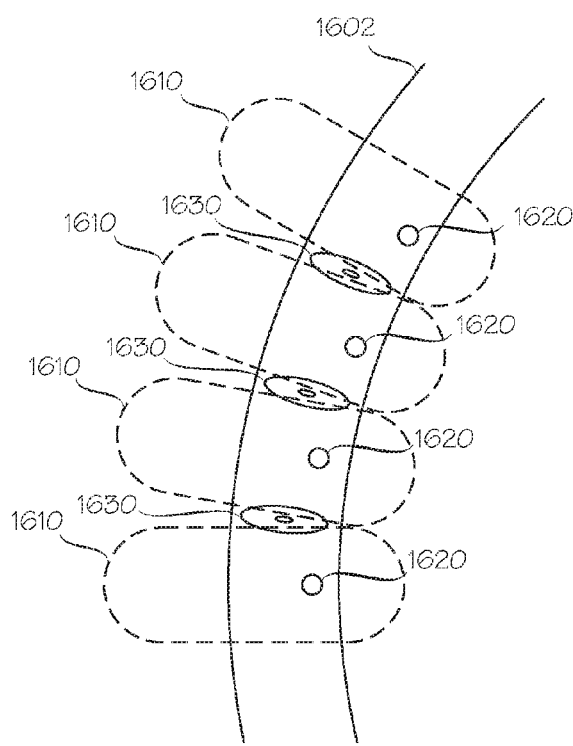
Figure 16C:
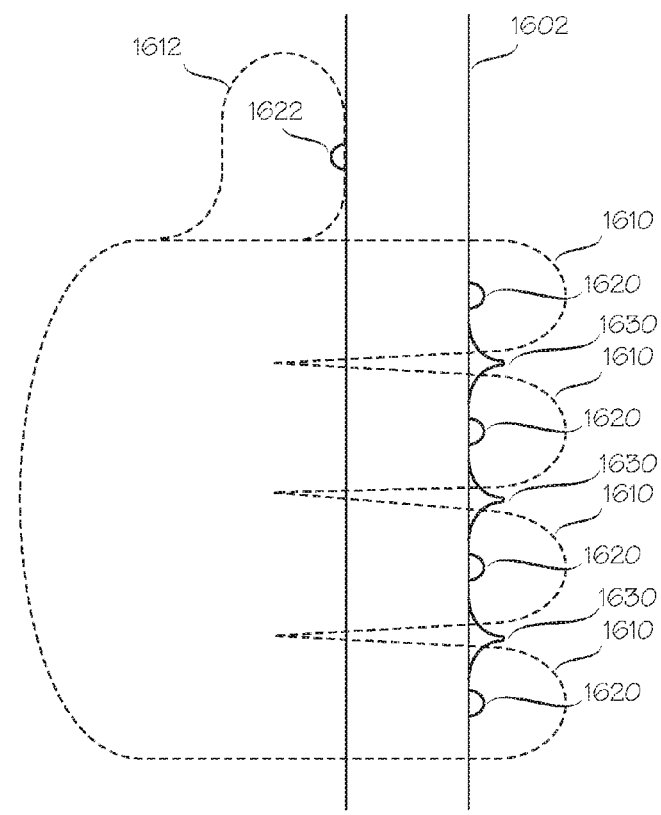

FIGS. 16A to 16C schematically illustrate placement of tactile pads in a steering wheel or close to it. In FIG. 16A, reference numeral 1600 denotes an area of a steering wheel 1602 in which the vehicle driver places their fingers 1610 while driving the vehicle. Reference numeral 1604 denotes the centre section or hub of the steering wheel, which couples the steering wheel to the steering axle and which typically holds an airbag (not shown separately). The steering axle and centre section 1604 can be used to route wires to the tactile pads according to the invention. The section 1600 is shown enlarged in FIG. 16B, which schematically shows the areas occupied by the driver's four fingers 1610. In the embodiment shown in FIG. 16B, there is a tactile pad 1620 for each finger 1610, although it is not mandatory to have a one-to-one correspondence between fingers and tactile pads. In simple embodiments even one tactile pad can be used to present some information, such as "detailed information shown on LCD display", although more ambitious embodiments employ multiple tactile pads. In some embodiments the entire rim of the steering wheel, or the upper half-rim, may be provided with tactile pads. In this embodiment each tactile pad corresponds to a specific portion of a numerical range and one pad is activated at a time, thus indicating the portion of the range which contains the actual value of the information element. For instance, if the information element is the vehicle's speed, one pad may indicate a velocity of 100 to 105 km/h, while the next pad in the clockwise direction indicates a velocity of 105 to 110 km/h. Two neighbouring pads might be simultaneously activated in cases where the current value of the information element, such as the vehicle's velocity, is within some predetermined margin from the average value of the union of the velocity ranges associated to the neighbouring tactile pads. For instance, the two above-mentioned tactile pads are simultaneously activated, the vehicle's velocity might be 105±2 km/h.

It is beneficial, even if not strictly mandatory, to provide the area 1600 with static formations 1630 which guide the driver's fingertips to the tactile pads. For instance the static formations may take the form of pointed tips, elongated ridges, notches, rings, or any form which is distinguishable from the overall shape of the steering wheel. Unlike the individually controllable tactile pads, which are dynamic in nature because they present time-variant information, the formations 1630 are static because the information they provide is static in relation to time. In other words, as far as the present invention is concerned, the principal function of the static formations 1630 is to indicate the positions of the tactile pads or a subset of them. By indicating the positions of the tactile pads (or a subset of them), the static formations 1630 also indicate the positions of the value ranges assigned to the tactile pads.

FIG. 16C shows an embodiment in which there are, for either hand, one tactile pad 1622 on the upper side of the steering wheel for the driver's thumb 1612 and four more tactile pads 1620 on the underside of the steering wheel for the remaining four fingers 1610. As used herein, the upper side of the steering wheel means the side facing the driver in normal driving position. In this embodiment the four tactile pads 1620 on the underside of the steering wheel are separated by three peaks or ridges 1630. Assuming that a similar arrangement is provided for the driver's other hand, there are ten tactile pads which can show 11 different values if only one tactile pad is activated at a time.

For instance, the following scheme can be used:
All pads deactivated: velocity less than 30 km/h
Pad for left little finger activated: velocity 30-39 km/h Pad for left ring finger activated: velocity 40-49 km/h
. . .
Pad for left thumb activated: velocity 70-79 km/h
Pad for right thumb activated: velocity 80-89 km/h
. . .
Pad for right little finger activated: velocity above 120 km/h.

As stated earlier, the resolution can be improved by activating two neighbouring tactile pads simultaneously in cases wherein the velocity is within some predetermined margin, such as 5 km/h, from the average value of the union of the velocity ranges associated to the neighbouring tactile pads. For instance, in the above example, the encoding scheme could be as follows:

All pads deactivated: velocity less than 30 km/h
Pad for left little finger activated: velocity 30-34 km/h
Pad for left little and ring finger activated: velocity 35-39 km/h
Pad for left ring finger activated: velocity 40-44 km/h
. . .

Thus the resolution is improved by a factor of two.

Figure 17A:
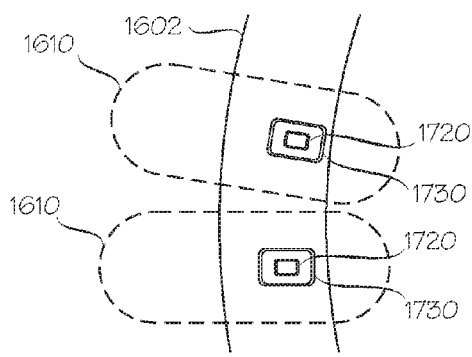
Figure 17B:
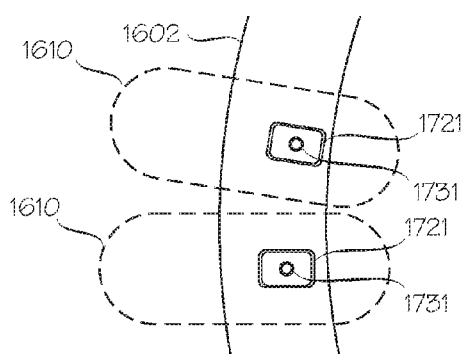

FIGS. 16B and 16C depict embodiments in which the static formations 1630, such as bumps or ridges, are spatially distinct from the tactile pads. This is not mandatory, and FIGS. 17A and 17B schematically illustrate embodiments in which the static formations spatially coincide with the tactile pads. FIG. 17A shows two tactile pads 1720, which are both placed within area occupied by respective formations 1730, such as raised areas. Conversely, FIG. 17B shows two tactile pads 1721 which are large enough to contain respective formations 1731, such as pointed tips.

Figure 18:
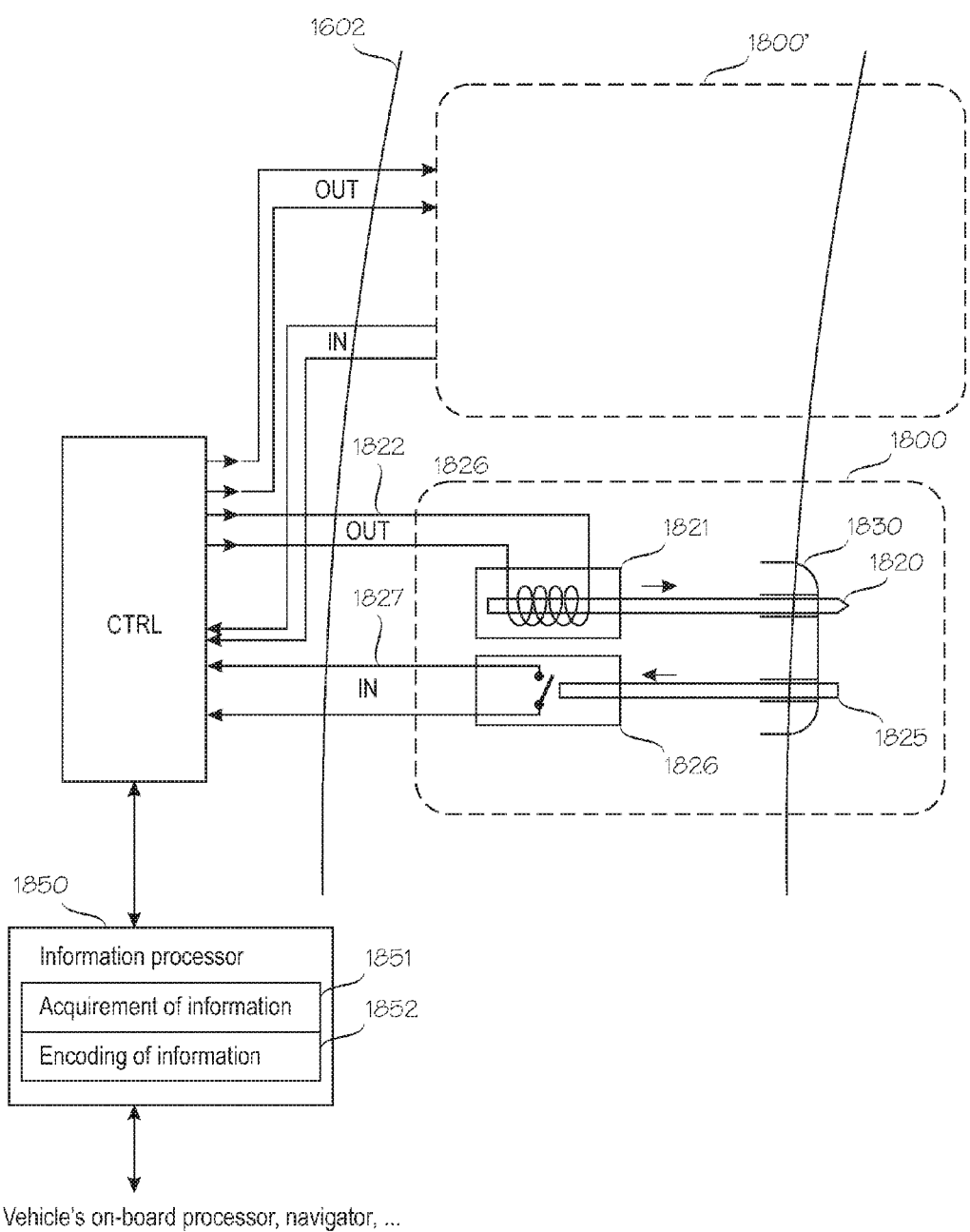
FIG. 18 schematically illustrates a bidirectional tactile pad which has an output section and an input section.

FIG. 18 schematically illustrates a bidirectional tactile pad which has a pad output section and a pad input section. For simplicity's sake, FIG. 18 only shows one bidirectional tactile pad in detail, which is demarcated by a dashed rectangle 1800. In practice, it is beneficial to provide the steering wheel with multiple tactile pads such that at least one or two are bidirectional tactile pads. Reference numeral 1800' denotes such additional tactile pads, of which the details have been omitted for the interest of clarity. The pad output sections present time-variant information to the vehicle driver, as described in connection with FIGS. 16A through 17B, while the pad input sections of the bidirectional tactile pads can be used to control some of the vehicle's functions.

As regards the pad output section, the representative bidirectional tactile pad 1800 has an output member 1820 which produces the individually controllable tactile sensation to the driver. In the present example, the output member 1820 is a plunger operated by a micro-solenoid 1821, which in turn is controlled by the on-board controller CTRL via a pad output signal 1822. As regards the pad input section, the representative bidirectional tactile pad 1800 has an input member 1825 which the vehicle driver activates by pushing, pressing or squeezing with a finger. The input member 1825 activates a switch 1826 whose state is sensed by the on-board controller CTRL via a pad input signal 1827. In the illustrated embodiment, Reference numeral 1830 denotes a raised area, which is an example of a static formation and contains both the output member 1820 and input member 1825.

Reference numeral 1850 denotes an information-processing block or section which implements two functions. One of the functions, denoted by reference numeral 1851, is acquirement of the information element to be indicated, while the other function 1852 is encoding of the information element to the state(s) or position(s) of the tactile pad(s) to be activated. In order to be able to acquire the information element to be indicated, the information-processing block 1850 may be implemented as part of the vehicle's on-board data processing system or navigation system (not shown separately) or, as shown in FIG. 18, it may be implemented as a gateway between the on-board data processing system and the controller CTRL. The bidirectional arrow between the information-processing block 1850 and the controller CTRL means that the vehicle driver may use the input members 1825 of the tactile pads to select or adjust some vehicle-related operating parameter, which is conveyed to the information-processing block 1850. The information-processing block 1850 may, in turn, indicate this parameter of some derivative of it, via the controller CTRL and the output members 1820 of the tactile pads. An illustrative but non-restrictive example of a driver-adjusted parameter is the velocity range to be displayed (eg 30-70, 60-100, . . . ), while an example of a derivative of the driver-adjusted parameter is the vehicle velocity within the driver-selected range. For example, a velocity of 12 km/h in a range of 60-100 km/h means an actual velocity of 72 km/h.

FIG. 18 shows a representative but non-restrictive mechanical implementation by means of solenoids and switches, but the invention is not restricted to this implementation. For example, the solenoids 1821 can be replaced by piezoelectric actuators and/or the mechanical switches 1826 can be replaced by a wide variety of switch elements, such as membrane switches. Alternatively, the embodiment of the capacitive electro-sensory interface ("CEI") described in connections with FIGS. 14 and 15 can be used to implement the bidirectional tactile pad 1800.

In addition to the previously described embodiments, a tactile pad can be embodied as a device having a spatially-varying formation, such that the spatial variation of the formation provides an indication of the current value of the information element. For instance, the spatially-varying formation can be a bump, ridge or peak that is moved along a locus, such as a portion of the steering wheel's rim. The bump, ridge or peak can be moved by a motor to a position which corresponds to the current value of the information element, such as the vehicle's velocity.

An illustrative but non-restrictive application of the bidirectional tactile pad relates to cruise control devices (constant speed controllers). For example, the multiple output members 1820 might indicate the current speed to the driver via a tactile sensation, as described in connection with the previous examples. Two input members 1830 might be used to control the cruise control device as follows:

Simultaneous activation of both input members: begin setting of speed;
Activation of left input member: reduce set speed;
Activation of right input member: increase set speed;
No input member activation for 5 seconds: return to normal operation.

Instead of the input members 1830 shown in FIG. 18 or the input-enabled CEI interface described in connections with FIGS. 14 and 15, the cruise control device can be controlled by means of virtually any conventional control keys. For instance, one key may correspond to a speed increase of 2 km/h and another to a speed decrease of 2 km/h. During adjustment of the speed setting, the current speed setting value can be indicated by the array of tactile pads, in addition to a visual display.

Furthermore, use of a CEI tactile pad array as a touch input device supports embodiments in which increase/decrease setting commands are executed by sweeping the driver's finger or hand over the array, while pressing the cruise speed setting key with the thumb or the other hand: for instance, an clockwise or anti-clockwise sweeping gesture may respectively increase or decrease the speed setting by 2 km/h, and the controller may provide the driver with feedback by indicating the changed speed setting as a changed location of the activated tactile pad(s). Any repetition of the sweeping gesture further increases or decrease the speed setting, depending on the direction of the sweep. In a more ambitious implementation, the speed setting step may depend on the speed of the sweeping gesture. For instance, a slow sweeping gesture may increase the speed setting by 2 km/h, while a fast sweeping gesture may increase the speed setting by 5 km/h.

It is readily apparent to a person skilled in the art that, as the technology advances, the inventive concept can be implemented in various ways. The invention and its embodiments are not limited to the examples described above but may vary within the scope of the claims.

REFERENCES

Gunther, Eric: "*Skinscape: A Tool for Composition in the Tactile Modality*" Master's thesis, Massachusetts Institute of Technology 2001, available on http://mf.media.mit.edu/pubs/thesis/guntherMS.pdf

The invention claimed is:

1. An apparatus for presenting a time-variant information element in a vehicle, which has a steering wheel, the apparatus comprising:
a plurality of remotely and individually controllable tactile pads, each of which is operable to produce a tactile sensation in response to a respective pad output signal, wherein a plurality of pad output signals are produced by a controller, and wherein the plurality of tactile pads are positioned or adapted to be positioned on the steering wheel or proximate to the steering wheel, the plurality of tactile pads being configured to be touched by at least one hand of a vehicle driver while driving the vehicle;
means for determining the time-variant information element to be presented and for applying the determined time-variant information element to the controller; and
means for encoding the determined time-variant information element by the controller into temporal variations of the plurality of pad output signals, wherein the encoding comprises encoding the time-variant information element to a simultaneous set of states of the plurality of tactile pads;
whereby the apparatus is configured to present the time-variant information element to the vehicle driver via the tactile sensation.

2. The apparatus according to claim 1, wherein the time-variant information element has a current value and a current range and the encoding comprises assigning a portion of the current range to each tactile pad; and activating one of the plurality of tactile pads whose assigned range includes the current value of the time-variant information element.

3. The apparatus according to claim 2, wherein the encoding further comprises activating two neighbouring tactile pads simultaneously if the current value of the time-variant information element is within a predetermined margin from the average value of a union of velocity ranges associated to the two neighbouring tactile pads.

4. The apparatus according to claim 1, further comprising one or more static formations positioned so as to guide the vehicle driver's fingers to the plurality of remotely and individually controllable tactile pads.

5. The apparatus according to claim 4, wherein at least one of the remotely and individually controllable tactile pads at least partially overlaps at least one of the one or more static formations.

6. The apparatus according to claim 4, wherein at least one of the one or more static formations at least partially overlaps at least one of the remotely and individually controllable tactile pads.

7. The apparatus according to claim 1, wherein the encoding comprises enabling presentation of the time-variant information element for a predetermined period of time in response to at least one of:
a detection of a change of a value of the time-variant information element exceeding a predetermined threshold; or
a detection of a predetermined act of the vehicle driver.

8. The apparatus according to claim 1, wherein the remotely and individually controllable tactile pads comprise at least one electromechanical stimulus generator.

9. The apparatus according to claim 1, wherein the remotely and individually controllable tactile pads comprise at least one capacitive electro-sensory interface.

10. The apparatus according to claim 1, wherein the remotely and individually controllable tactile pads comprise at least one device having means for moving a formation to one of multiple different positions according to the determined time-variant information element.

11. The apparatus according to claim 1, wherein the time-variant information element is selected from a group which comprises:
the vehicle's speed;
indication of a current speed limit or a change thereof, as determined by a navigation device;
a deviation of the vehicle's speed from the current speed limit, wherein the current speed limit is determined by a navigation device; and
a deviation from a normal range in one or more running parameters of an engine of the vehicle.

12. A method for presenting a time-variant information element in a vehicle, which has a steering wheel, the method comprising:
providing the steering wheel with two or more remotely and individually controllable tactile pads, each of which is operable to produce a tactile sensation in response to a respective pad output signal, wherein a plurality of pad output signals are produced by a controller, and wherein the two or more tactile pads are positioned on the steering wheel or proximate to the steering wheel, the two or more tactile pads being configured to be touched by at least one hand of a vehicle driver while driving the vehicle;
determining the time-variant information element to be presented and applying the determined time-variant information element to the controller; and
encoding the determined time-variant information element by the controller into temporal variations of the plurality of pad output signals, wherein the encoding comprises encoding the information element to a simultaneous set of states of the two or more tactile pads.

* * * * *